United States Patent [19]
Kiuchi et al.

[11] Patent Number: 5,553,226
[45] Date of Patent: Sep. 3, 1996

[54] SYSTEM FOR DISPLAYING CONCEPT NETWORKS

[75] Inventors: Itsuko Kiuchi, Tokyo; Hiromichi Fujisawa, Tokorozawa; Atsushi Hatakeyama; Minoru Wakabayashi, both of Kokubunji, all of Japan

[73] Assignee: Hitachi, Ltd., Tokyo, Japan

[21] Appl. No.: 430,241

[22] Filed: Oct. 30, 1989

Related U.S. Application Data

[63] Continuation-in-part of Ser. No. 276,384, Nov. 25, 1988, abandoned, which is a continuation-in-part of Ser. No. 844,123, Mar. 26, 1986, Pat. No. 4,868,733.

[30] Foreign Application Priority Data

Oct. 31, 1988 [JP] Japan ................................. 63-272974
Jun. 14, 1989 [JP] Japan ..................................... 1-149629

[51] Int. Cl.$^6$ ................................................... G06T 1/00
[52] U.S. Cl. ........................................... 395/161; 395/157
[58] Field of Search .................................. 364/518, 521, 364/419; 395/155, 161, 156, 157, 158, 159, 160

[56] References Cited

U.S. PATENT DOCUMENTS

| | | | |
|---|---|---|---|
| 4,625,295 | 11/1986 | Skinner ................................... | 364/900 |
| 4,752,889 | 6/1988 | Rappaport et al. .......................... | 395/1 |
| 4,823,306 | 4/1989 | Barbic et al. ............................. | 364/900 |
| 4,868,733 | 9/1989 | Fujisawa et al. ........................ | 364/200 |
| 5,062,060 | 10/1991 | Kolnick ................................... | 364/521 |

FOREIGN PATENT DOCUMENTS

| | | |
|---|---|---|
| 0130050A3 | 1/1985 | European Pat. Off. . |
| 60-254326 | 12/1985 | Japan . |
| 61-5844 | 1/1986 | Japan . |
| 61-220027 | 9/1986 | Japan . |
| 1-140332 | 4/1989 | Japan . |

OTHER PUBLICATIONS

APS—Text Search + Retrieval Classroom Manual Section 2 pp. 2–1–2–6, PRC, May 1987.
"Interactive Classification as a Knowledge Aquisition Tool" by T. Finin et al, First International Workshop on Expert Database Systems, Oct. 27, 1984, Kiawah Island, SC pp. 79–90.
"An Intelligent Database Assistant", F. Tou, et al, Proceedings of National Conference of AAAI, 1992, pp. 314–318.
"Menu–Based Natural Language Understanding", H. Tennant, Proceedings of the 1984 AFIPS National Computer Conference, Jul. 1984, Las Vegas, NV, pp. 629–635.
"Knowledge Representation for Model Management System", D. Dolk, et al, IEEE Transactions on Software Engineering, vol. SE–10, No. 6 Nov. 1984, New York, NY, pp. 619–628.

Primary Examiner—Heather R. Herndon
Attorney, Agent, or Firm—Antonelli, Terry, Stout & Kraus

[57] ABSTRACT

When a network representing the relationship among immense concepts is indicated using a multi-window function, a concept network display system simultaneously displays a superconcept for a current concept in the network, a network representing the subsumption relation of the current concept, and a network representing generic and instance relations of the current concept in a dynamically linked relationship. The concept network display system also edits the displays of the networks by rewriting displayed networks in response to selection of a new current concept, and displays a history of the current concepts without repetition.

22 Claims, 28 Drawing Sheets

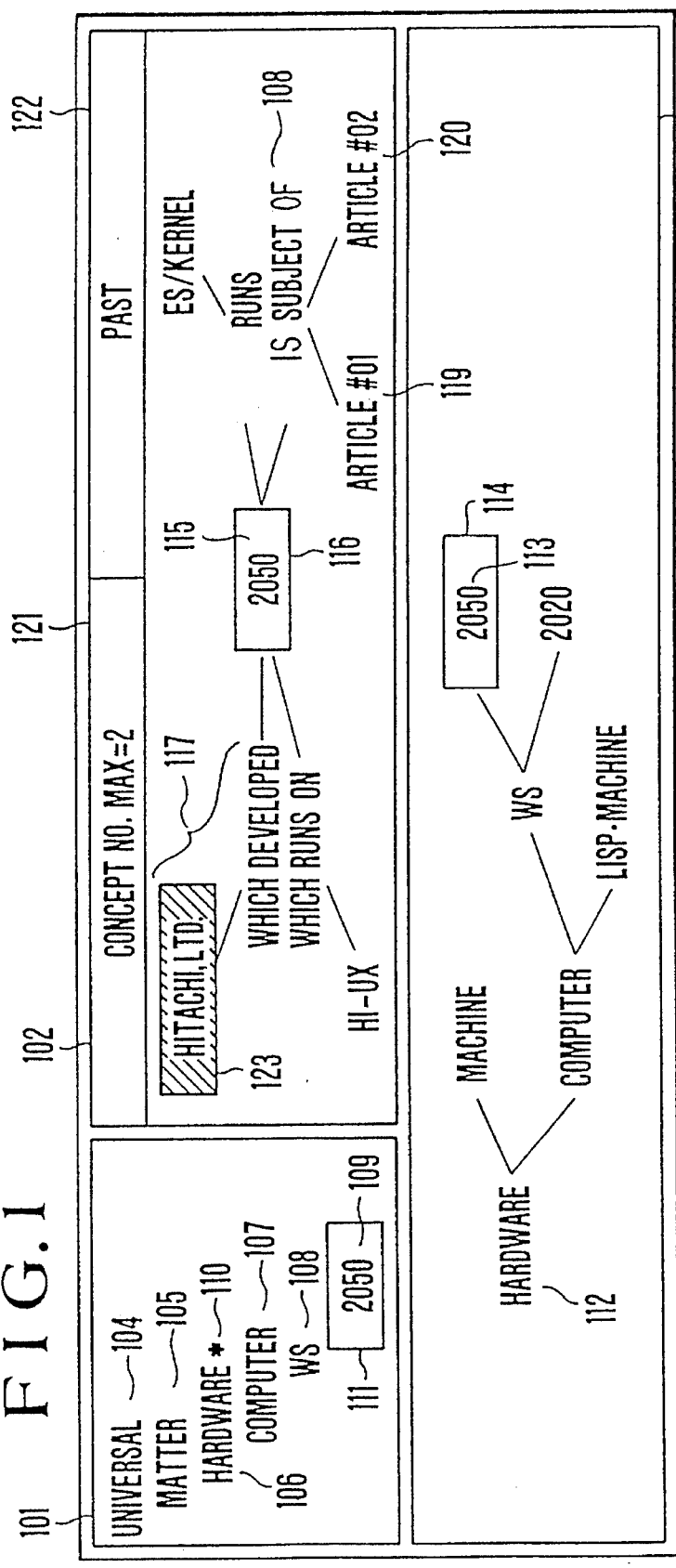
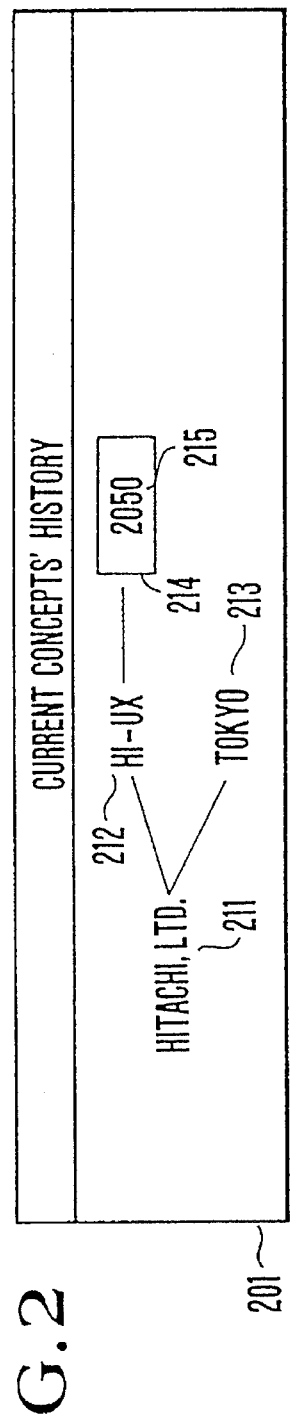

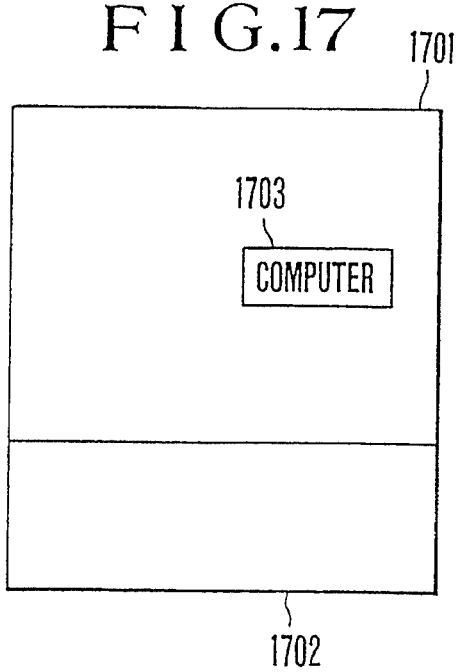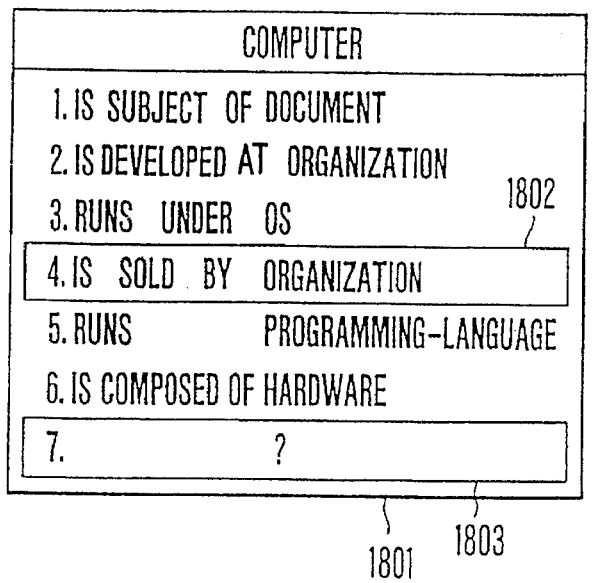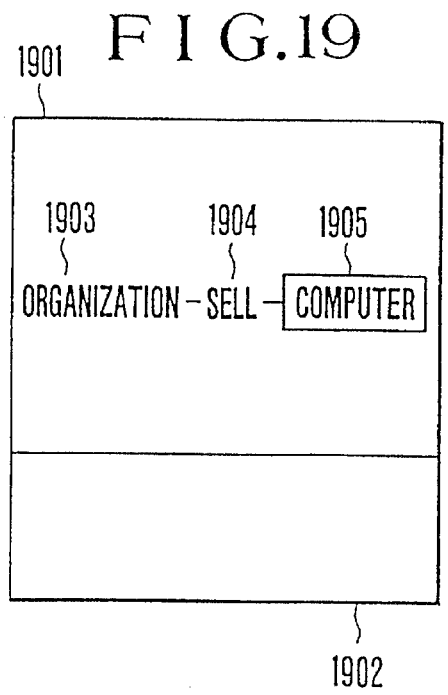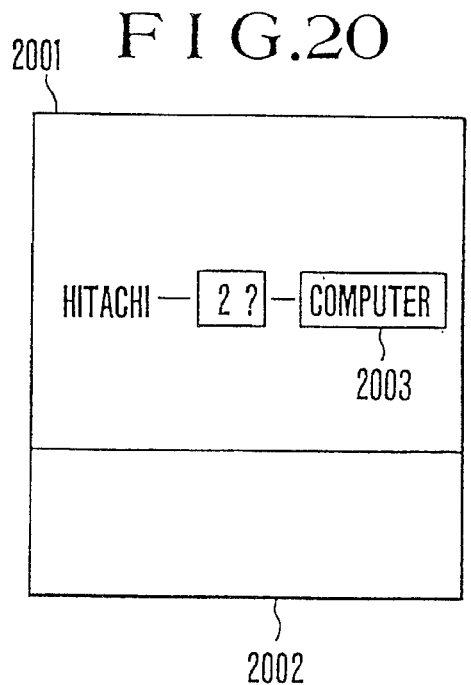

F I G. 64
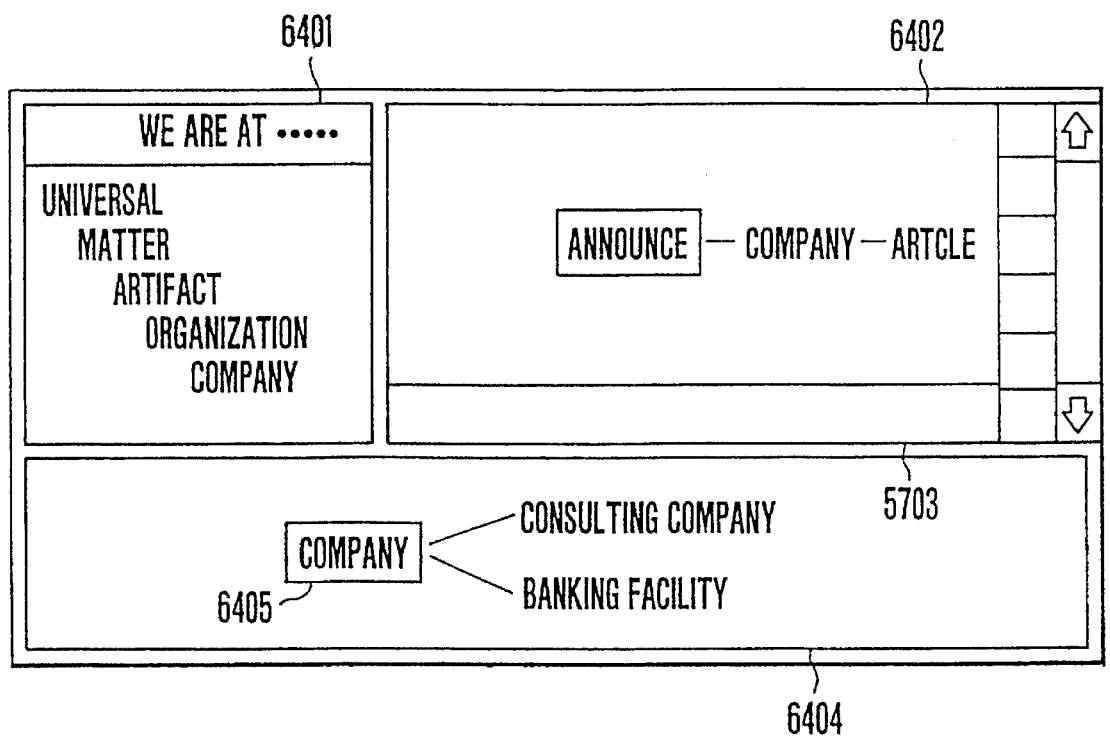

SYSTEM FOR DISPLAYING CONCEPT NETWORKS

This application is a continuation-in-part of U.S. application Ser. No. 276,384, filed Nov. 25, 1988, now abandoned, which is a continuation-in-part of U.S. application Ser. No. 844,123, filed Mar. 26, 1986, now U.S. Pat. No. 4,868,733.

BACKGROUND OF THE INVENTION

The present invention relates to a system for displaying concept networks, and more particularly to a network display system which efficiently displays knowledge stored with a network structure in an electronic file, using a computer with a multi-window display capability.

Recently, small-sized, large-capacity storage devices, such as optical disc storages have become available for use as document filing devices in offices. The operations of such devices, such as management and retrieval of a data base, which conventionally allows specialists to store and/or retrieve a large amount of data, are now performed directly by end users. Systems in which knowledge bases are applied to such filing systems are described, for example, in U.S. application Ser. No. 844,123, filed Mar. 26, 1986, now U.S. Pat. No. 4,868,733.

The expression of knowledge in the knowledge base used in the system disclosed in application Ser. No. 844,123 will now be described with reference to FIG. 3 which shows the scheme of a concept. In FIG. 3, an ellipse and an arrow represent a concept and a relation, respectively. In the knowledge base, all concepts are combined in a subsumption relation where the concept "UNIVERSAL" is the anchor concept. The subsumption relation represents the relationship "A concept X is one of concepts Y". A concept ranking high compared with a reference concept is referred to as a superconcept while a concept ranking low compared with the reference concept is referred to as a subconcept. For example, in FIG. 3, the superconcepts for a "COMPUTER" 311 are "UNIVERSAL" 301, "MATTER" 305, and "HARDWARE" 310. Concepts put general concepts in a generic relation. When the relationship between two concepts is expressed in general terms, two different names are obtained depending on which of the two concepts is handled as a main one. For example, concept "ORGANIZATION" 306 and "HARDWARE" 310 may be considered together by the generic relation "DEVELOPMENT" 324. The name of that relation has two definitions, "HARDWARE" which the "ORGANIZATION" "HAS DEVELOPED", and "ORGANIZATION" which "HAS DEVELOPED" the "HARDWARE". An instance relation puts pieces of instance knowledge in a relationship. In order to establish such relationship, superconcepts must be combined by a generic relation with the same relation name. For example, concept "HITACHI, LTD." 309 and concept "2050" 314 are combined by the instance relation "DEVELOPMENT" 328. The user can browse through concepts stored in a knowledge base, and the concept which the user notes in his browse is hereinafter referred to as a current concept.

There are several knowledge base display systems, as disclosed, for example, in U.S. application Ser. No. 06/844,123, now U.S. Pat. No. 4,868,733. The proposed system is of the type which uses commands which are executed for all current concepts. A command tree is prepared for display of a concept tree in a subsumption relation. If a command tree for display of a concept tree, the depth m of the displayed concept tree, and a branching factor of n, are input as [tr m n], the tree of the current concept and other concepts of the same ranking level and subconcepts for the current concept will be displayed with a depth m and a branching factor n. A command wh is prepared for display of a superconcept for the current concept. If [wh] is input, the superconcept for the current concept is displayed. A command fr is prepared for display of a concept frame which displays an instance relation attached to the current concept. If [fr] is input when the current concept is "2050", a frame of "2050" is displayed. For example, "HITACHI, LTD. DEVELOPED" is displayed in a first line of the frame, "WHICH RUNS UNDER HI-UX" is displayed in a second line, and "WHOSE SUBJECT IS ARTICLE #02" is displayed in a third line. By giving a command "fr 2", a frame for the concept "HI-UX" in the second line of the displayed frame is further displayed.

Since the history of concepts in which the user moved the current concept is not stored in memory, the concepts must be searched again in order that the concept searched before is again the current concept. Generally, there is a "back-trace function" as a means for tracing the history. If the "back-trace function" is used as a means for tracing the history of the current concept, and the current concepts move in the order of "2050", "HITACHI, LTD.", "2050", and "HI-UX", the history will be traced in the order of "HI-UX", "2050", "HITACHI, LTD." and "2050" by inputting a command "bt" for tracing purposes.

The above prior art has the following problems, so that it cannot provide a flexible display and therefore it is difficult to browse.

Since each operation is performed on a command basis, respective commands for display of a concept tree, a concept frame and a superconcept must be entered in order to obtain data on the concept.

In a concept tree display, a branching factor and a depth are designated for display of concepts ranking low compared with the current concept. Since a concept tree is displayed necessarily using the current concept as the anchor concept, however, a world which includes the current concept including the anchor concept, and concepts of the same ranking level cannot be displayed using a concept tree. Therefore, when it is desired to know concepts of the same ranking level as, or of a higher ranking level than, the current concept, the current concept must first be moved to the position of a superconcept and the concept tree must again be displayed. In addition, since the concept tree cannot be displayed by solely defining the concept tree with a branching factor and a depth, the user cannot collect and display portions of the concept tree which the user is interested in. Therefore, when it is desired to display in detail part of a displayed concept tree, the branching factor and depth must be changed to rewrite the concept tree or the current concept must be moved to a superconcept for a portion of the tree which the user desires to know in detail, and commands for display of the concept tree must be entered to rewrite the display of the concept tree. If the values of the branching factor and depth are increased, however, the number of concepts to be displayed is increased, so that they cannot be viewed on a single display screen. Conversely, if the values are decreased, desired information cannot be viewed and hence operability is low.

Even if the command "bt" is used as means for tracing the history, the concepts can only be arranged in the order of movement of the current concept. For example, even when the current concepts moved in the order of "2050", "HITA- CHI, LTD.", "2050", and "HITACHI, LTD.", display is effected in this order. Therefore, when the same concept becomes the current concept many times, it is displayed each of those times to thereby render it impossible to trace the history.

As just described above, according to the operation of the above-referenced system, it is very difficult to appropriately display data which the user needs.

SUMMARY OF THE INVENTION

It is an object of the present invention to provide a system which, in order to solve the above problems and to display in a many-sided manner a network to represent the contents of-knowledge stored in a knowledge base, will display networks from a plurality of view fields using a concept which the user notes as the center, and will edit the display.

It is another object of the present invention to provide a system which holds the history of movement of the current concept and displays the history of movement of the current concept in a network.

The above objects are achieved by a system which, when a network representing the relationship among immense concepts is indicated using a multiwindow function, simultaneously displays a superconcept for the current concept in the network, a network representing the subsumption relation of the current concept, and a network representing generic and instance relations of the current concept in a dynamically linked relationship; edits the displays of the networks; and displays a history of the current concept in a network.

The principles and operation of a retrieval apparatus according to the present invention are illustrated in FIG. 1, which shows a screen or picture on which the display of a network is effected in an interactive manner. A superconcept window 101 which displays a superconcept for the current concept, a concept tree window 103 which displays a concept tree including the current concept, and a subnetwork window 102 are displayed on the screen. All of these windows are active ones through which the user can interact with the system. The system stores in memory the coordinates of a train of characters of a concept displayed in an interactive window, and extracts the train of characters of the concept when clicked by a mouse. The coordinates of the train of characters are stored in the following form for each window:

---

(HITACHI, LTD. $(X_1\ Y_1\ H_1\ W_1)$)
(2050 $(X_2\ Y_2\ H_2\ W_2)$)
.
.
(HI-UX $(X_n\ Y_n\ H_n\ W_n)$)

--- where $X_1$ represents the X coordinates of the chain of characters, $Y_1$ represents the Y coordinates, $H_1$ represents the number of vertical dots in the chain of characters, and $W_1$ represents the number of horizontal dots.

The current concept has pointers 111, 114, 116 for, for example, black-white inversion, framing, underlines in a bit map attached thereto, so that they are displayed invariably and recognized easily in each of the windows. In FIG. 1, the current concept is the concept "2050".

The superconcept window sequentially displays therein a concept "UNIVERSAL" 104, "MATTER" 105, "HARDWARE" 106, "COMPUTER" 107, "WORK STATION" 108, and "2050" 109 combining the anchor concept "UNIVERSAL" and the current concept "2050" in a subsumption relation. In addition to the coordinates of the chain of characters of the displayed concept, data on the subsumption relation of the "UNIVERSAL" concept through the current concept "2050" is stored internally in the following list:

(UNIVERSAL MATTER HARDWARE
COMPUTER WORK STATION 2050)

The pointer 110 in the superconcept window indicates that the concept "HARDWARE" 106 is the anchor concept displayed in the concept tree window 103. The concept with pointer 110 is hereinafter referred to as the anchor. If the name of the concept displayed in the superconcept window 101 is designated with the mouse, the pointer 110 of the anchor is moved to the concept and the concept tree displayed in the concept tree window 103 is rewritten.

The subnetwork window 102 displays therein in a network the instance relationship attached directly to the current concept and the generic relation. In FIG. 1, since the current concept is "2050" 115, the instance relation, for example, "2050 which is developed by HITACHI, LTD" added to "2050" 115 is displayed The number of concepts combined by the name of the same relation as the current concept and designated by a menu 121 is displayed. In FIG. 1, the maximum number of concepts is 2. Therefore, even if there are two or more concepts associated with the current concept "2050" 115 in the relation "WHOSE SUBJECT IS" 118, only typical concepts, "ARTICLE #02" 119, "ARTICLE #04" 120 in the instant case, are displayed. In order to display concepts other than the above-mentioned ones, the function of changing the maximum number of concepts via a menu 123 or the function of editing the display of the subnetwork is provided. For the display of the subnetwork, the coordinates of a chain of characters of a concept displayed and the coordinates of a chain of characters of the relation are stored internally and, further, the relation is stored in an S equation such as is shown as follows:

---

(((("HITACHI, LTD.") "WHICH DEVELOPED")
(("HI-UX") "WHICH RUNS ON"))
(("WHICH RUNS ON" ("ES/KERNEL"))
("WHOSE SUBJECT IS" ("ARTICLE #01"
"ARTICLE #02"))))

---

When displayed in the subnetwork window, the portions of the S equation:

---

(((("HITACHI, LTD.") "WHICH DEVELOPED")
(("HI-UX") "WHICH RUNS ON"))

--- are displayed on the left side of the current concept "2050", and the portions:

---

(("WHICH RUNS ON" ("ES/KERNEL"))
("WHOSE SUBJECT IS" ("ARTICLE #01" "ARTICLE #02"))))

--- are displayed on the right side of the current concept. Whether "HITACHI LTD." is displayed on the right side of the current concept "2050" like "2050 WHICH IS DEVELOPED BY HITACHI, LTD." or on the left side of the current concept like "HITACHI, LTD. WHICH DEVELOPED 2050" is determined by the relation name for the generic relation "DEVELOPMENT" registered first by the user.

Since, in the instant case, the "DEVELOPED" is first registered, "HITACHI, LTD." is displayed on the left side of the current concept "2050".

The concept tree window displays therein the anchor concept, the subconcepts and the current concept in a network. Data on the subsumption relation of the concepts is stored internally in the following S equation:

```
((UNIVERSAL (MATTER PALCE))
 (MATTER (ORGANIZATION HARDWARE ... ))
 (HARDWARE (MACHIEN HARDWARE))
 (COMPUTER (WORK STATION ... ))
  .
  .
  .
 (WORK STATION (2050 2020)))
```

As shown in FIG. 1, when display of the concept tree is to be changed in the concept tree window, the subconcepts for the anchor concept "HARDWARE" are traced, transformed to the following S equation:

```
((HARDWARE
 ((MACHINE)
    ((COMPUTER
      ((WORK STATION
        ((2050 2020)))
       ((LISP MACHINE))))
``` on the basis of the default values of the branching factor and depth, and then displayed.

The system stores the history of the current concept, which the user traced, in memory in an S equation of LISP and displays the history of the current concept in a network. If the name of a concept is designated with the mouse in the window which displays the network of the history, the current concept moves to the former concept. For example, menu 122 is designated with the mouse, the window which displays the history of the current concept which the user traced is displayed in a pop-up manner. One example of the window is illustrated in FIG. 2, which shows that the user moved from the concept "HITACHI, LTD." 211 to "HI-UX" 212 or to "TOKYO", and also that traced from the concept "HI-UX" 212 to the latest current concept "2050" 214. A pointer 215 illustrates that the concept "2050" 214 is the current one. Data on the history of the current concept is stored internally in an S equation as follows:

```
(HITACHI, LTD. ((HI-UX (2050))
    (TOKYO)))
```

If a concept becomes the current one again, a pointer in the S equation is only moved and the S equation is not changed. In the S equation, the pointer is in the current concept "2050". For example, when the current concept moves to "HITACHI, LTD.", the pointer is moved from "2050" to "HITACHI, LTD.", but the S equation is not changed. When the current concept moves from "HITACHI, LTD." to "2020", the S equation is rewritten as follows:

```
(HITACHI, LTD. ((HI-UX (2050))
    (TOKYO)
    (2020)))
```

A change of the current concept is possible by designating the concept displayed in the concept tree window (103 in FIG. 1), subnetwork window (102 in FIG. 1) or current concept history window (201 in FIG. 2) with the mouse. In FIG. 1, if the name of the concept is displayed in the concept tree window 103, the system moves the concept to the former concept. Further, the display of superconcept window 101 is rewritten with a superconcept for the current concept and the pointer 114 of the current concept in the concept tree window 103 is moved to a new current concept. In addition, the display of subnetwork display window 102 is rewritten with a network in the vicinity of the new current concept. On the other hand, if the name of the concept displayed in subnetwork window 102 or a window (201 in FIG. 2), which displays the history of the current concept, is designated with the mouse, the current concept is moved to the displayed concept, the superconcept window 101 is rewritten with a superconcept for the current concept, and the display of subnetwork display window 102 is rewritten with the network in the vicinity of the new current concept. If the new current concept is displayed in concept tree window 103, the pointer 114 of the current concept is moved to the current concept. If nothing is displayed in concept tree window 103 and the new current concept is a subconcept for the anchor concept, a superconcept for the new current concept is checked, data on the subsumption relation is stored in memory and displayed in conjunction with the displayed concept tree, and the pointer 114 of the current concept is moved to the current concept. If the new current concept is not a subconcept for the anchor concept, the display of the concept tree is rewritten by the value of the threshold distance using the superconcept as a new anchor concept.

The number of concepts displayable in the concept tree window is limited. The user may collect and display only concepts, which he or she is interested in, using the function of editing the concept tree display. The user may change the display of part of the concept tree displayed in the concept tree window by designating a concept, and the depth and branching factor of the display of a subconcept for the concept. If the user designates the threshold distance, namely, the number of relations among concepts, the display is rewritten with a network of concepts at the threshold distance from the current concept. If the name of a concept is designated with the mouse after the command "SHRINK", the display of the concept is erased or described briefly.

BRIEF DESCRIPTION OF THE DRAWINGS

FIG. 1 shows a screen or picture tube on which networks are displayed;

FIG. 2 illustrates a window which appears in a pop-up manner when the history of a current concept is represented;

FIGS. 17–61 illustrate query editions, system messages, menu, etc., appearing in one process for preparing the query editions; and FIGS. 62–64 illustrate screens on which query editions are prepared.

DETAILED DESCRIPTION OF THE PREFERRED EMBODIMENTS

Figure 4:
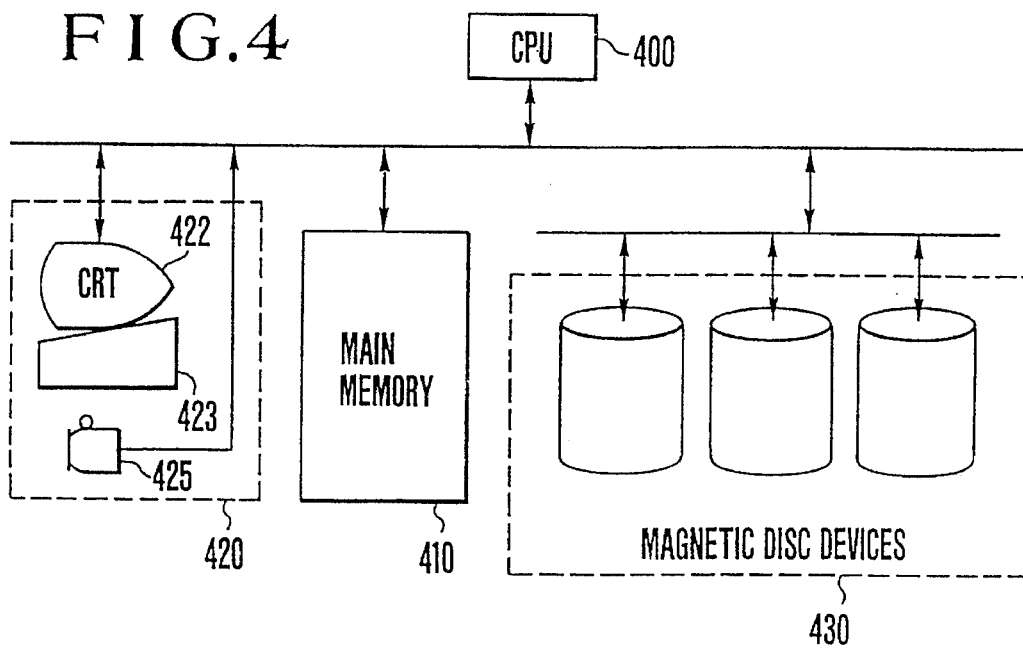
FIG. 4 illustrates the structure of a system according to the present invention.

FIG. 4 is a schematic of a knowledge base display as one embodiment of the inventive system. The structure and operation of the whole display will now be described. The display includes a control unit (CPU) 400, a main memory 410, magnetic disk storage units designated generally by 430, a terminal 420, a CRT 422, a keyboard 423, and a mouse 425. The display of a knowledge base is performed by terminal 420. The objects to be displayed are registered concepts, and a collection of facts described as relations among the concepts and data on such concepts and the collection of facts are stored in files 430. Control of windows in terminal 420 is effected by CPU 400. Mouse 425 is capable of selecting a concept or a menu displayed on CRT 422. Free indication is possible using such a function without relying on keyboard inputs. The control of a picture on CRT 422 is provided by CPU 400.

The main operation of the display system will now be described. When the display of the knowledge base starts, a window required for indication of the knowledge base is displayed on CRT 422. At this time, data on the position of a train of characters displayed in the window is stored in main memory 410. When mouse 425 is clicked, the position of the data is searched, the train of characters clicked by the position data stored in main memory 41 is fetched. When mouse 425 is clicked, a window to be redisplayed by control unit 400 is searched, and necessary data is searched from magnetic disk 430 and is displayed.

Figure 5:
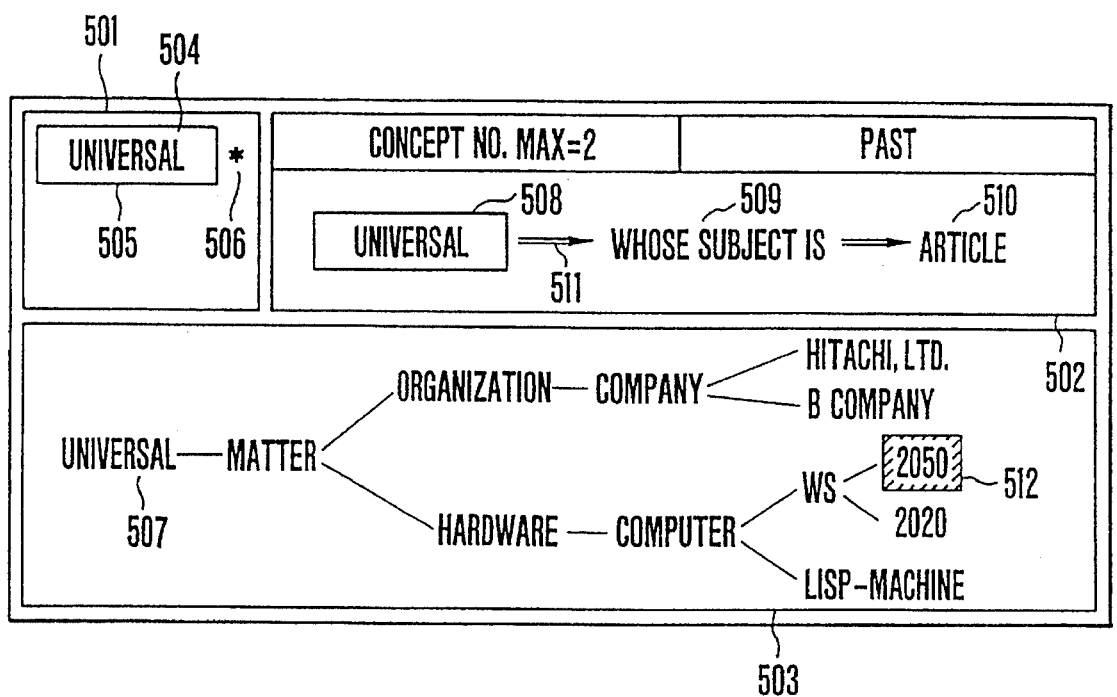
FIGS. 5–8 illustrate pictures appearing in the process of display of networks.

The present invention will now be described specifically with respect to FIG. 1 and FIGS. 5–11. FIG. 5 shows an initial picture which displays the knowledge base. The current concept and the anchor concept for the concept tree are initially set to "UNIVERSAL" which is the anchor concept. Therefore, the train of characters "UNIVERSAL" 504 is displayed in superconcept window 501, and pointers 505 and 506 of the current and anchor concepts, respectively, are put at the position of "UNIVERSAL" 504. Part of the concept tree having the anchor concept as "UNIVERSAL" 507 is displayed in concept tree window 503. An instance relation and a generic relation given to the current concept "UNIVERSAL" are displayed in subnetwork window 502. The relation given to the concept "UNIVERSAL" is only the generic relation "ARTICLE WHOSE SUBJECT IS UNIVERSAL". Therefore, as shown in FIG. 5, the name of the concept "UNIVERSAL" 508, the name of the relation "WHOSE SUBJECT IS" 509, and the name of "ARTICLE" 510 are connected with a double line 509 which indicates a generic relation. Since the instance relation is not formed, it is not displayed.

Figure 6:
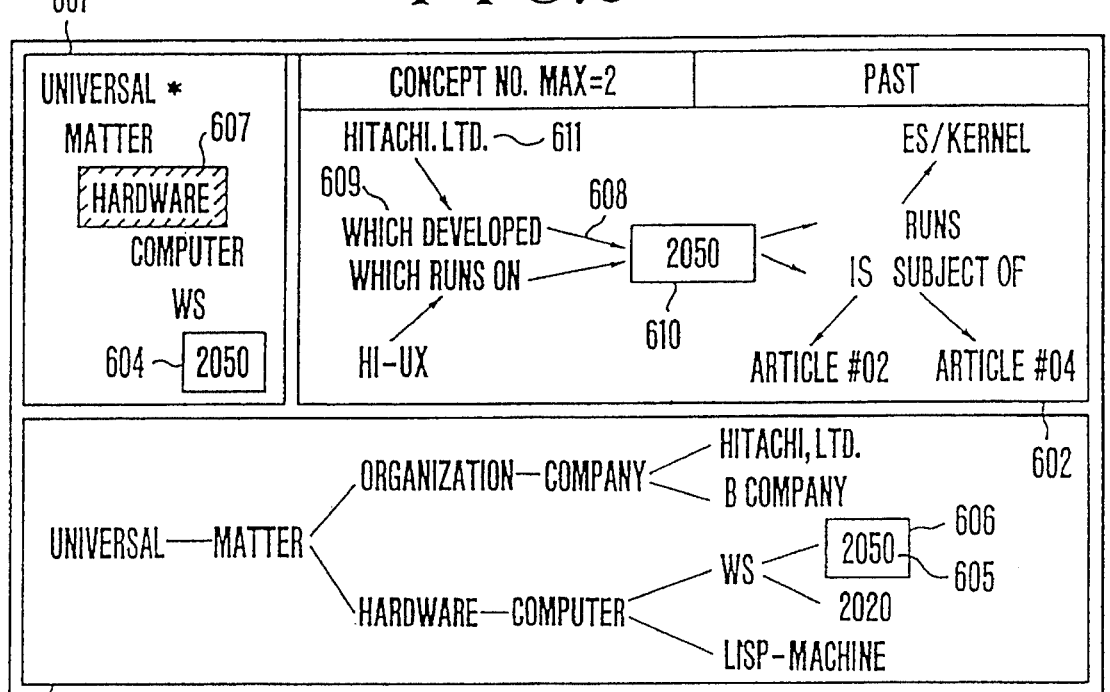
Figure 12:
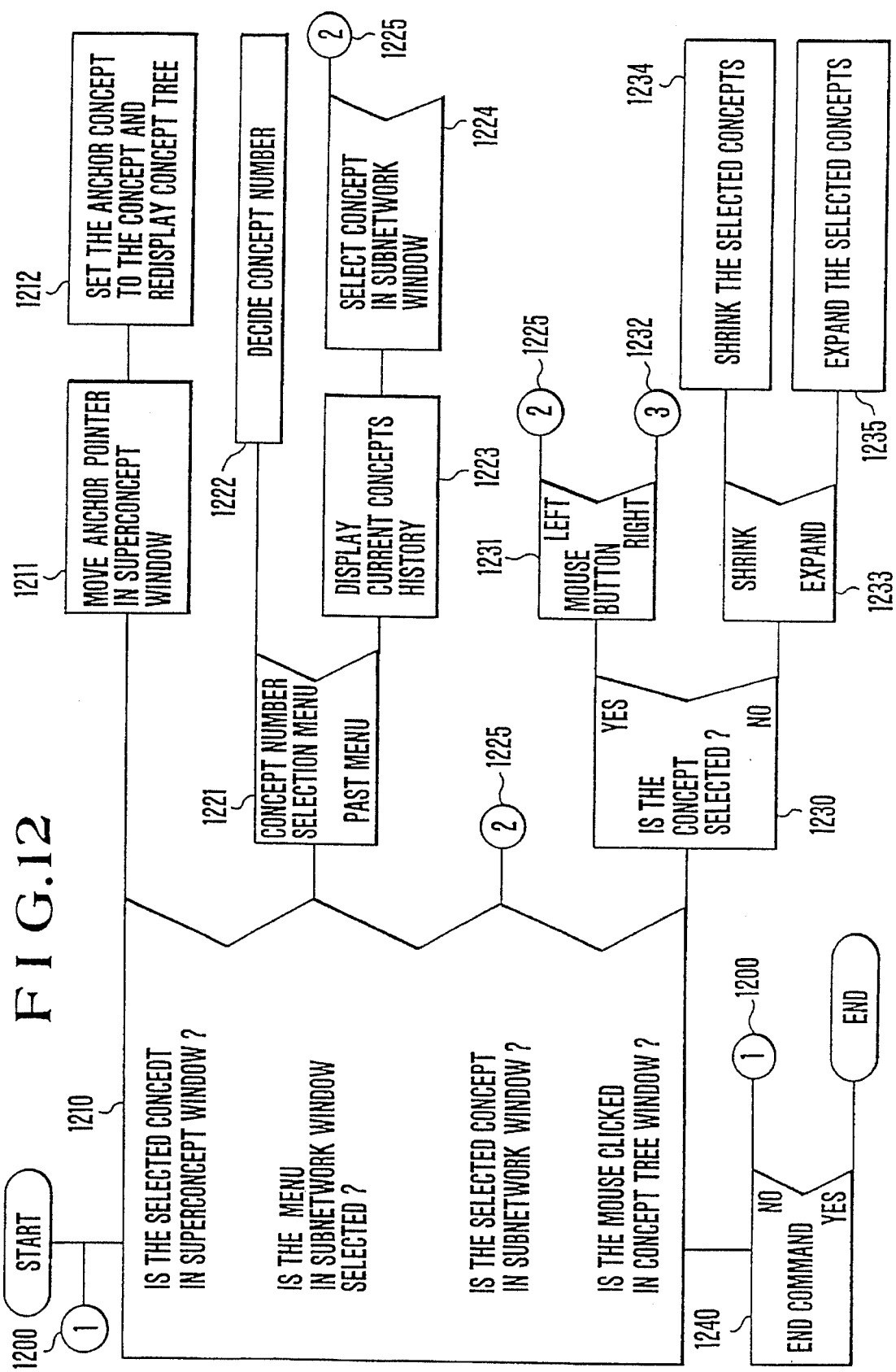
FIGS. 12–14 illustrate a flow of processes in the present invention.
Figure 13:
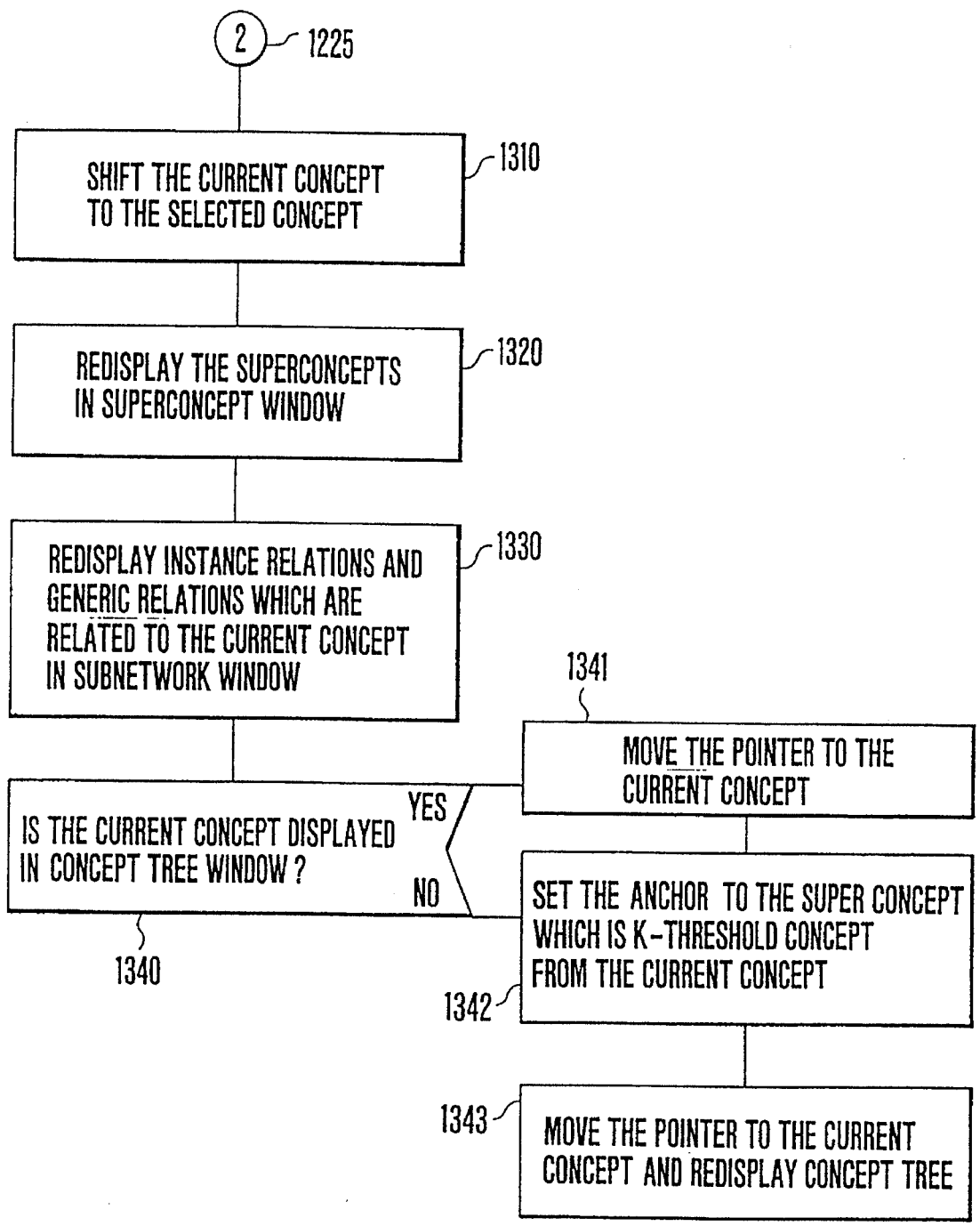

FIG. 6 shows a picture formed when the user designates the train of characters 512 of the concept "2050" displayed in concept tree window 503 and thereby shifts the current concept from "UNIVERSAL" to "2050". The superconcept for the current concept "2050" is displayed in superconcept window 601. Pointer 606 is put at "2050" 605 in concept tree window 603. The display of subnetwork window 602 is rewritten by the relation attached to concept "2050". Since an instance relation alone is attached to concept "2050", the instance relation is described with solid line 608, separately from the above-mentioned generic relation. For example, it represents that concept "2050" 610 and "HITACHI, LTD." 611 have the instance relation "WHICH DEVELOPED" 609 attached thereto. FIGS. 12 and 13 illustrate the flow of processes performed by the time the picture of FIG. 5 shifts to that of FIG. 6, and are diagrams of a PAD which determines which process should be selected. At step 1210, it is determined whether the train of characters of the concept displayed in the concept tree window or the menu in the subnetwork window is selected with the mouse. At step 1210, when the mouse is clicked in the concept tree window, step 1230 is selected to determine whether the train of characters of the concept is clicked with the mouse. At step 1230, when the train of characters of the concept is clicked, it is determined whether it is clicked with a right button of the mouse or it is clicked with a left button at step 1231. If it is clicked with the left button, step 1310 of FIG. 13 is selected via joiner 1225. At step 1310, the concept designated with the mouse is used as the current concept. At step 1320, the superconcept for the new current concept is searched and the searched superconcept is redisplayed in the superconcept window, and the pointer of the current concept is moved to the current concept. At step 1330, the instance relations and generic relations related to the current concept are searched and the searched relations are redisplayed in the subnetwork window. At step 1340, it is determined whether the current concept is displayed in the concept tree window. If so, step 1341 is selected to move the pointer to the current concept. If otherwise, step 1342 is selected to set the anchor to the superconcept which is at a threshold distance from the current concept. At step 1343, the concept tree is redisplayed using the obtained concept as the anchor and the pointer is moved to the current concept. Step 1240 is then selected where it is determined whether an end command is entered or not. If not, step 1210 is again selected through joiner 1200. If the end command is input, the display of the network is ended at that time.

FIG. 1 shows a picture formed when the train of characters 607 of the concept "HARDWARE" displayed in the superconcept window 601 in FIG. 6 is designated, and when a concept to be the anchor of the concept tree displaced in the concept tree window is changed. Since the anchor moves, the pointer 110 of the anchor displayed in superconcept window 101 is moved to the position of "HARDWARE" 106. In addition, the concept of the anchor displayed in concept tree window 103 is changed to "HARDWARE" 112 to rewrite the display of the concept tree. FIG. 12 shows the flow of process performed by the time when the picture of FIG. 6 changes to that of FIG. 1. At step 1210, since the train of characters of the concept in the superconcept window is designated with the mouse, step 1211 is selected where the pointer of the anchor in the superconcept window is moved to the concept designated with the mouse. At step 1212, the concept tree having the concept as the anchor is redisplayed in the concept tree window and step 1240 is then selected.

Figure 7:
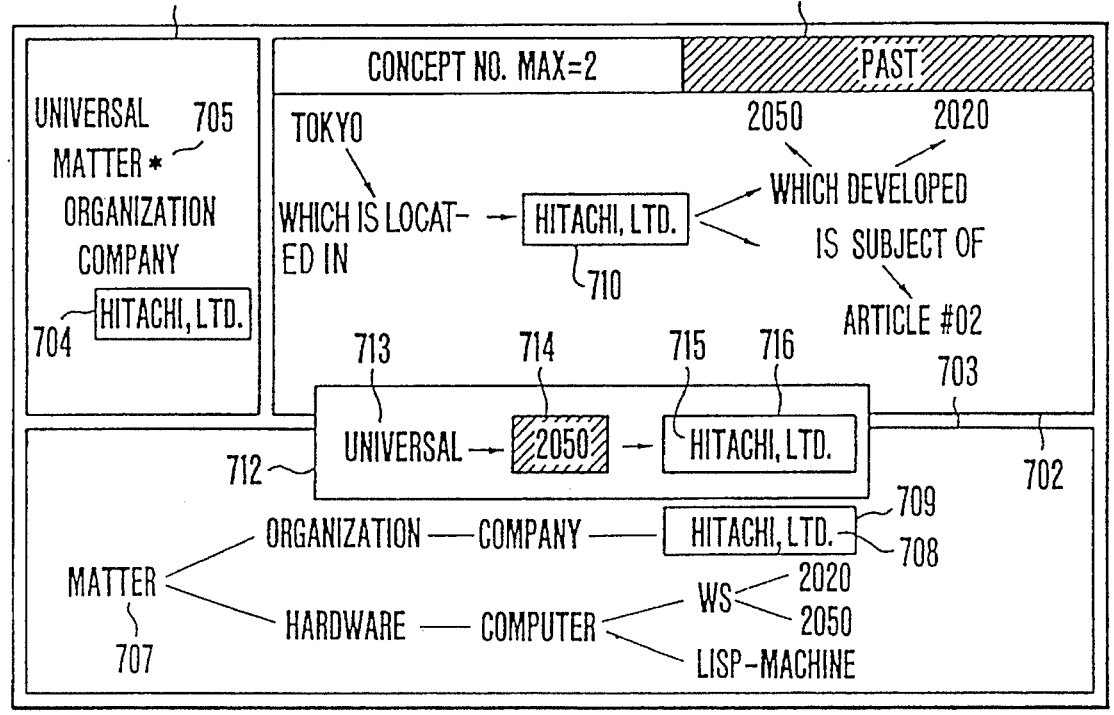

FIG. 7 shows a picture formed when a train of characters 121 of the concept "HITACHI, LTD." displayed in the subnetwork window in FIG. 1 is designated with the mouse and the current concept is moved from "2050" to "HITACHI, LTD.". The superconcept window 701 is rewritten with the display of the superconcept for the concept "HITACHI, LTD.". Since the concept "HARDWARE" which is the anchor in FIG. 1 is not the superconcept for the concept "HITACHI, LTD.", the superconcept for the current concept is used as the anchor for the default value of the threshold distance. For example, when the threshold distance is 3, the concept "MATTER" which is three-layers above compared to the concept "HITACHI, LTD." is used as the anchor.

Thus, the pointer 706 of the anchor is put at the position of "MATTER" 705, the display in concept tree window 703 is rewritten with the display of a concept tree having the concept "MATTER" as the anchor. The pointer 709 of the current concept is moved to "HITACHI, LTD." 708. The relation related to the concept "HITACHI, LTD." is displayed in the network. If menu 711 is clicked with the mouse, the system displays the history of the current concept, traced by the user, in a network in pop-up window 712. By this display, it will be seen that the user moves from the initial concept "UNIVERSAL" 713 to "2050" 714 and then to "HITACHI, LTD." 715. FIGS. 12 and 13 show the flow of processes performed by the time when the picture of FIG. 1 changes to that of FIG. 7. Since the train of characters of the concept in the subnetwork is designated by step 1210, step 1310 of FIG. 13 is selected through joiner 1225. The processing at steps 1310, 1320, 1330, 1340 and 1341 is performed and the processing at step 124 of FIG. 12 is performed to return to step 1210 through step 1200. Since at step 1210 the menu in the subnetwork window is selected, step 1221 is then selected where it is determined which of a concept selection menu and a PAST menu is selected. If the concept selection menu is selected, the number of concepts displayed in the subnetwork window is changed at step 1222. If the PAST menu is selected at step 1221, the pop-up window which displays the history of the current concept is opened.

Figure 8:
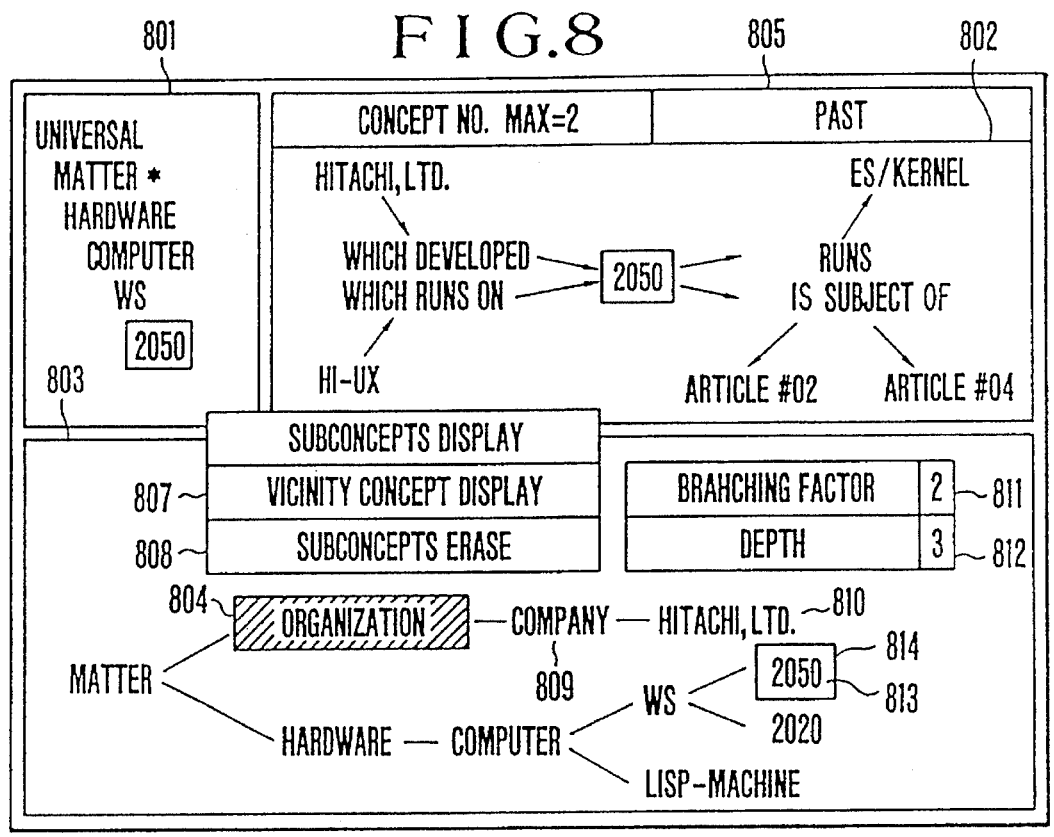

FIG. 8 shows a picture formed when the user designates with the mouse the train of characters 714 of the concept "2050" displayed in pop-up window 712 in FIG. 7 and moves the current concept to "2050". Since the current concept moves to "2050", the display of superconcept window 801 and subnetwork window 802 is rewritten. The pointer 814 of the current concept of concept tree window 803 moves to the chain of characters 813 of "2050". FIGS. 12 and 13 show the flow of processes performed by the time when the picture of FIG. 7 changes to that of FIG. 8. At step 1224, when the chain of characters of the concept in the pop-up window is selected, step 1310 of FIG. 13 is selected as shown by joiner 1225. The processes at steps 1310, 1320, 1330, 1340 and 1341 of FIG. 13 are performed, further the process at step 1240 of FIG. 12 is performed and step 1210 is again selected through joiner 1200.

If a train of characters 804 of the concept "ORGANIZATION" displayed in concept tree window 803 is designated with the right button of the mouse in FIG. 8, a pop-up menu is displayed. If "SUBCONCEPT DISPLAY" 806 is selected among the items of the menu, only a subconcept for the concept "ORGANIZATION" is rewritten with a depth of m and a branching factor of n in the concept tree. If "VICINITY CONCEPT DISPLAY" 807 is selected, the word of a concept which is at a threshold distance of k from the concept "ORGANIZATION" is rewritten. If a "SUBCONCEPT ERASE" 808 is selected, the display of a concept tree where trains of characters of subconcepts for the concept "ORGANIZATION", namely, "ORGANIZATION" 804, "COMPANY" 809 and "HITACHI, LTD." are erased can be rewritten.

Figure 9:
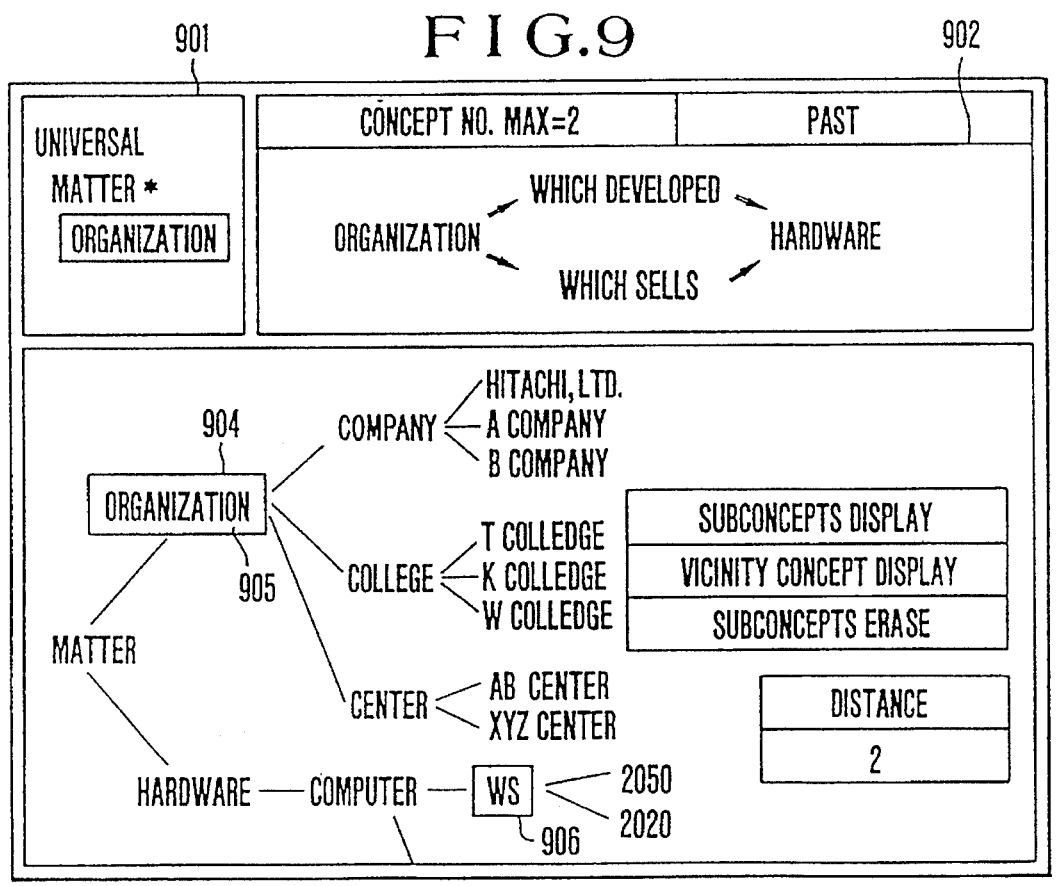
FIGS. 9–11 illustrate windows in the process of display and editing of networks.
Figure 14:
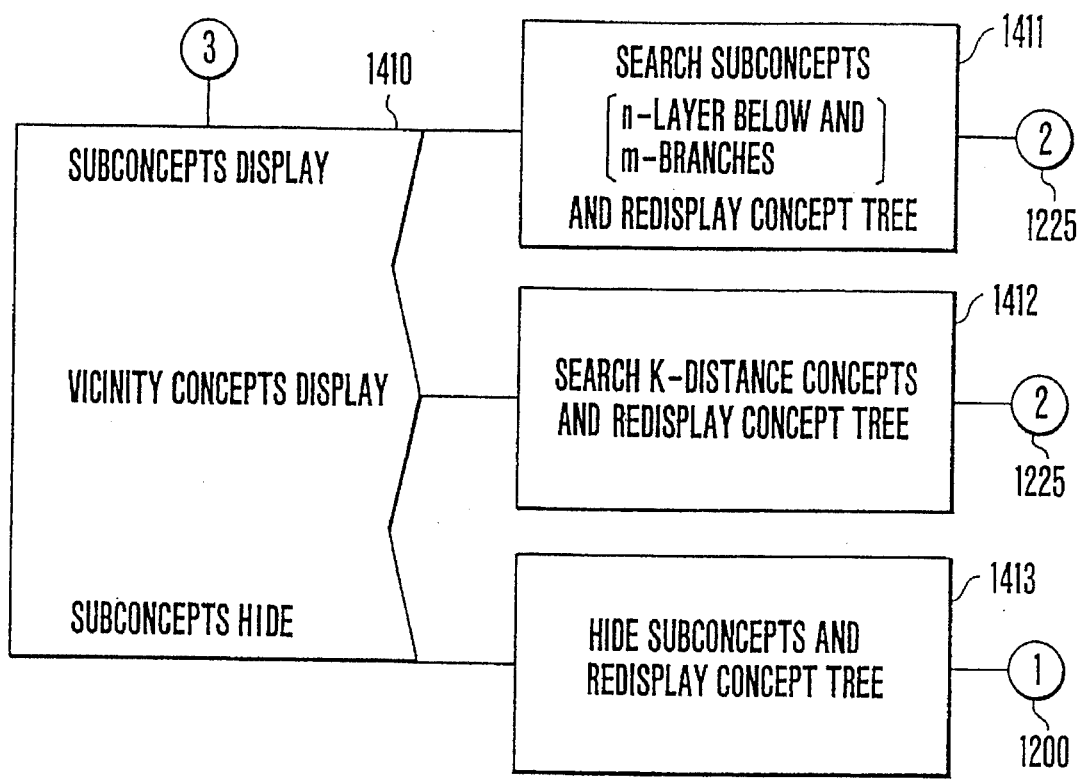

FIG. 9 shows a picture formed when "SUBCONCEPT DISPLAY" 806 in menu 805 is selected and a branching factor of 3 and a depth of 2 are designated. The concept tree in the concept tree window 902 rewrites the subconcept "ORGANIZATION" designated in FIG. 8 with a branching factor of 3 and a depth of 2. At this time, "COMPANY" 809 and "HITACHI, LTD" 810 displayed in FIG. 8 are displayed inclusively. Since the current concept moves to "ORGANIZATION", the display of superconcept window 901 and subnetwork window 902 is rewritten. In addition, Pointer 904 of the current concept in concept tree window 903 is moved to the chain of characters 905 of "ORGANIZATION". FIGS. 12–14 show the flow of processes performed by the time when the picture of FIG. 8 changes to that of FIG. 9. At step 1210 of FIG. 12, if the train of characters of the concept in the concept tree window is designated with the right button, the processes at steps 1230, 1231 are performed and step 1410 of FIG. 14 is then selected through joiner 1232. If the subconcepts addition of the menu is selected at step 1410 of FIG. 14, a concept tree is added by designating a subconcept for the concept with a branching factor and a depth at step 1411. Furthermore, the processes at steps 1310, 1320, 1330, 1340 and 1341 of FIG. 13 are performed through joiner 1225. The process at step 1240 of FIG. 12 is then performed and step 1210 is then selected again through joiner 1220.

In FIG. 9, if the user designates the chain of characters 906 of the concept "WORK STATION" displayed in concept tree window 903 with the right button of the mouse, menu 907 is displayed. Further, if the user designates "VICINITY CONCEPT DISPLAY" 909 in menu 907, menu 910 to designate the threshold distance is displayed. If the user designates the threshold distance in menu 910, only concepts which are at the distance, determined by the user, from "WORK STATION" 906 can be displayed.

Figure 10:
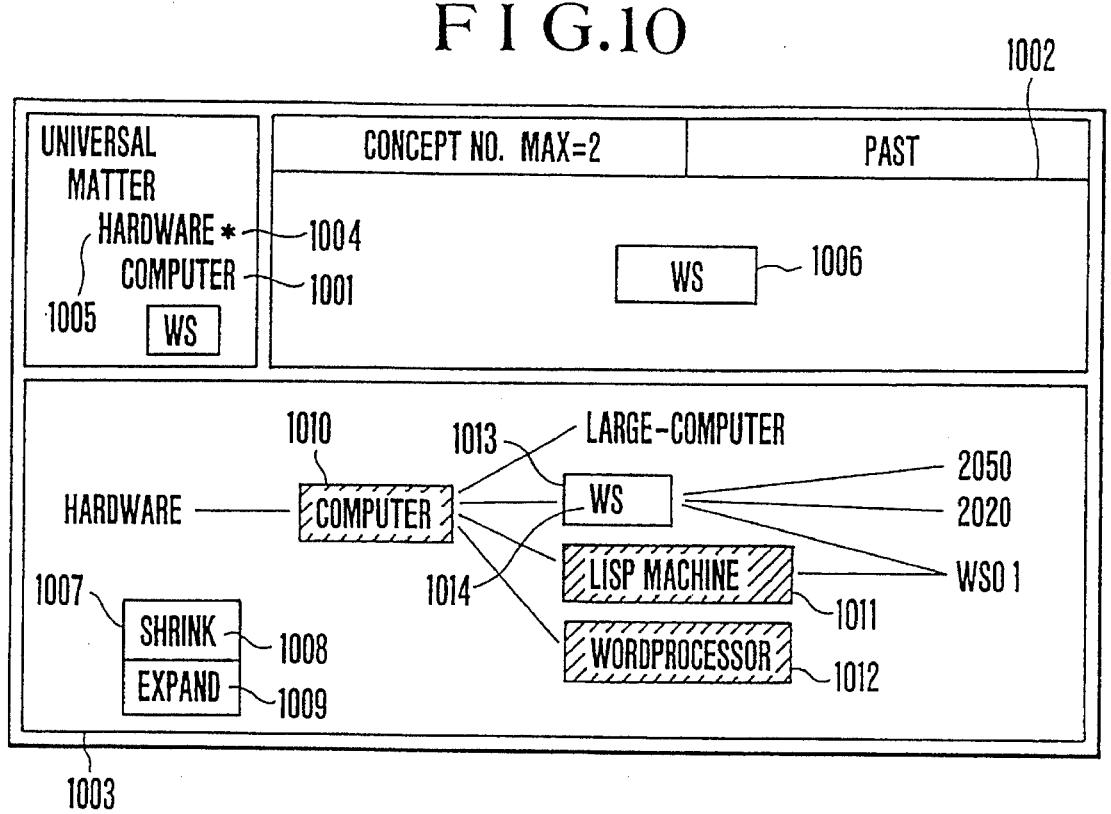

FIG. 10 shows a picture formed when "VICINITY CONCEPTS ADDITION" 909 is selected and a threshold distance of 2 is designated. A concept which is at a distance of 2 from "WORK STATION" in the subsumption relation to the "WORK STATION" is displayed. Namely, a concept which is at a distance of two line segments indicative of a subsumption relation from the "WORK STATION" is displayed with a concept tree. As shown in FIG. 10, up to a concept which is, for example, two-layers above "WORK STATION" is displayed for superconcepts for the "WORK STATION". Since the current concept moves to the concept "WORK STATION" designated by the user, the displays of superconcept window 1001 and subnetwork window 1002 are rewritten. Since there are no instance and generic relations attached to the work station, only the "WORK STATION" 1006 is displayed in subnetwork window 1002. Pointer 1013 of the current concept in concept tree window 1003 moves to a chain of characters 1014 of the "WORK STATION". Since the concept which will be the anchor is changed to "HARDWARE" which is two-layers above the "WORK STATION", the anchor 1004 in the superconcept window is put at the position of the train of characters 1005 of the "HARDWARE". FIGS. 12–14 show the flow of processes performed by the time when the picture of FIG. 9 moves to that of FIG. 10. At step 1210 of FIG. 12, if the chain of characters of the concept in concept tree window 1002 is designated with the right button, the processes at steps 1230, 1231 are performed, and step 1410 of FIG. 14 is then selected through joiner 1232. Step 1410 shows the selection of vicinity concept addition display. At step 1412, the display of the concept tree is rewritten with a vicinity concept for the earlier-mentioned concept. Processes at steps 1310, 1320, 1330, 1340 and 1341 of FIG. 13 are performed through joiner 1225. The process at step 1240 of FIG. 12 is then performed and step 1210 is again selected through joiner 1220.

In FIG. 10, if a portion of concept tree window 1002 where a train of characters of a concept is not displayed is designated with the right button of the mouse, pop-up menu 1007 is displayed. If "SHRINK" 1008 is selected and the chain of characters of a concept is designated with the mouse, the designated concept is described briefly. Conversely, if "EXPAND" 1009 is selected and the briefly described concept is designated, the chain of characters of the designated concept is again displayed.

Figure 11:
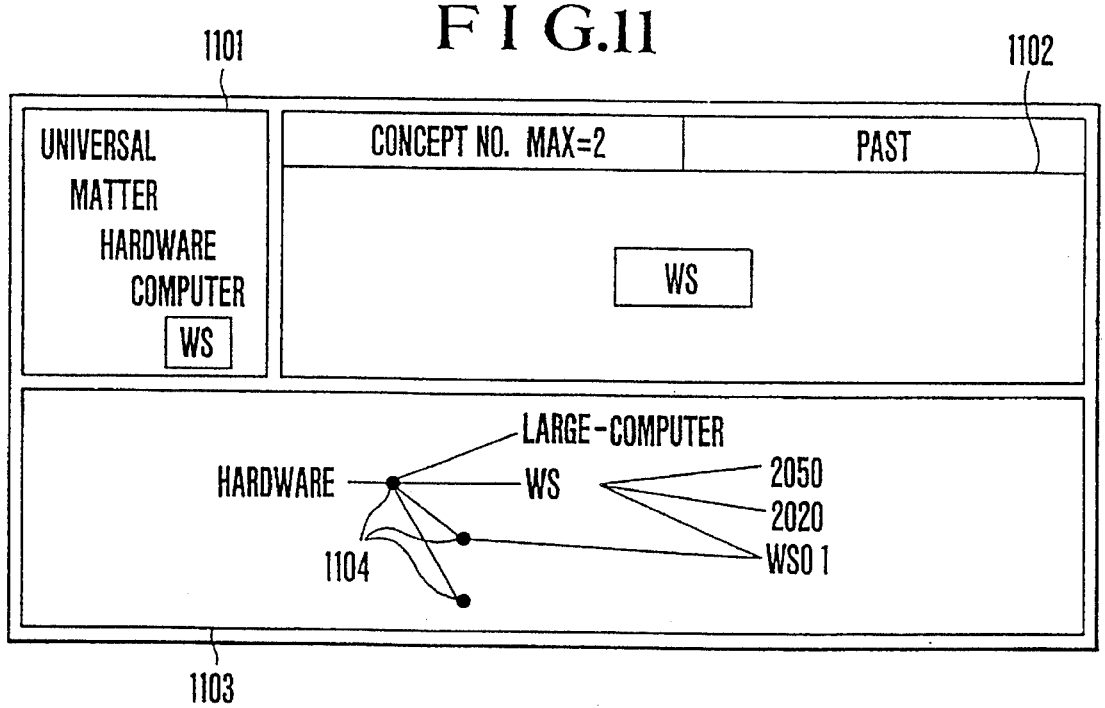

FIG. 11 shows a picture formed when "SHRINK" 1008 in pop-up menu 1007 is selected in FIG. 10 and "COMPUTER" 1010, "LISP MACHINE" 1011, and "WORD PROCESSOR" 1012 are selected. The selected concepts are shown briefly in black dots (1104 in FIG. 11). The flow of processes performed from FIG. 10 to FIG. 11 will now be described. Assume that at step 1210 of FIG. 12, the mouse is clicked in the concept tree window. When the train of characters of a concept is not selected with the mouse, a shift is made from step 1230 to step 1233. At step 1233, it is determined which of SHRINK and EXPAND menus is selected. If the former is selected, a concept to be SHRINKed is designated and the concept tree is again displayed at step 1234.

The method of forming query conditions used for retrieval of knowledge in the form of a network structure in the electronic file will now be described. In the instant embodiment, the formation of a flexible query edition by employing a diagramatic presentation and using the two-dimensional characteristics of the presentation will now be described. The embodiment provides a method of diagramatically displaying a query edition which facilitates a visual understanding of the sense of the query edition; relates the same concept to a plurality of concepts; limits or partially deletes the query edition; changes relations among concepts; describes concepts or relations in parallel; obscurely represents relations among concepts; eliminates a specified one of the concepts; reuses the formed query edition; briefly represents concepts in the query edition; and changes the anchor concept of a concept tree displayed in the concept tree window.

More specifically, query conditions are displayed using a diagramatic representation which represents respective concepts of the query editions as nodes, and the respective concepts as links which link the respective concepts. By this display, relating the same concept to a plurality of concepts is realized as well.

Limitation or partial deletion of the query editions is effected by range designation due to mouse manipulation. A change of the relations among concepts is realized by display of changeable relations in menu and selection of the appropriate relation. Elimination of a particular concept is realized by employing a process for newly representing the relation "excluding".

By designating obscure relations among concepts with depths, the system automatically allocates and retrieves the relations.

By expressing part of the query editions in a nominal compound or icon expression, brief expression of concepts in the query editions is realized. By storing an icon in a reserve window, the reuse of the formed query editions is realized.

Figure 3:
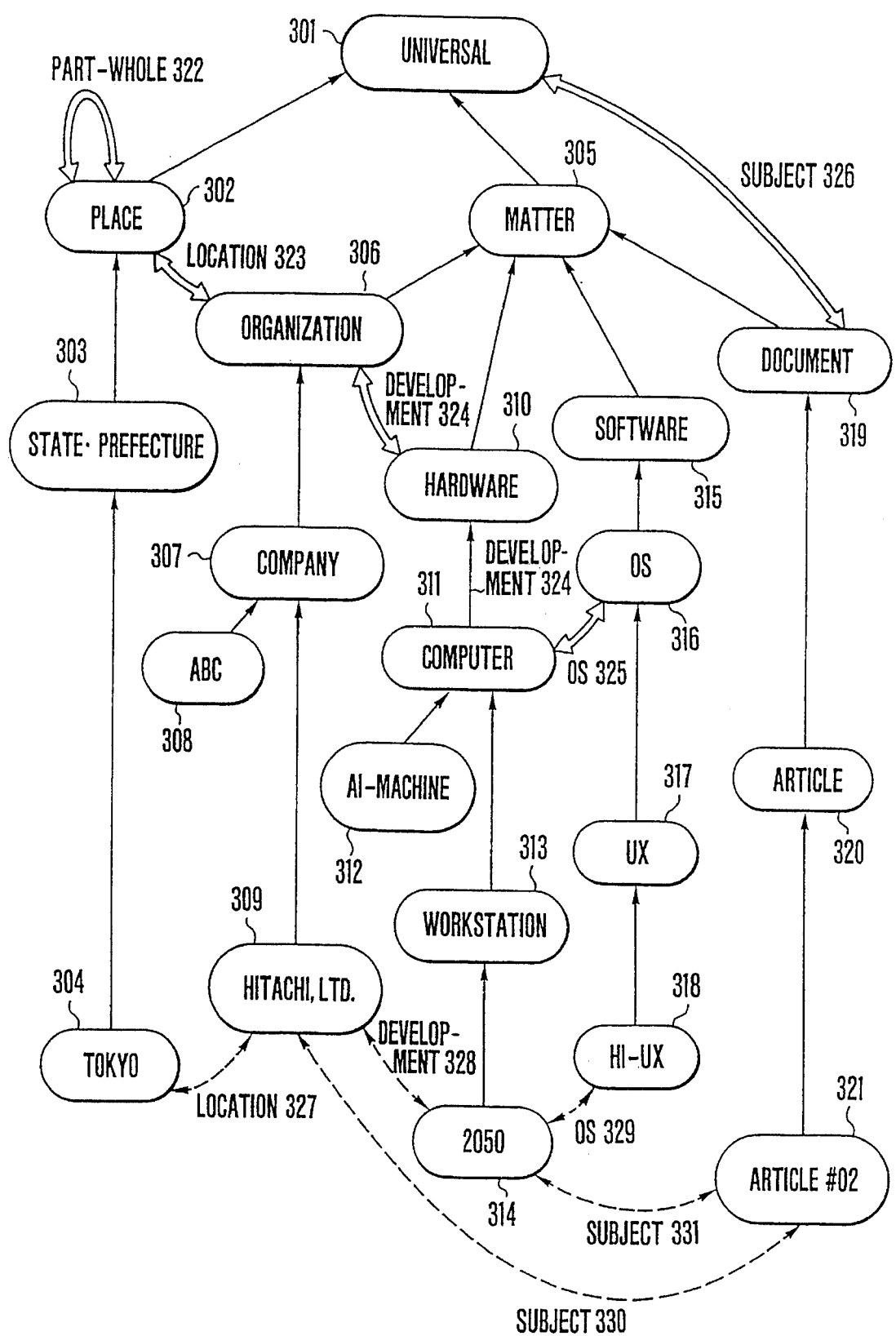
FIG. 3 represents concepts whose data is stored in a data base and associated knowledge.
Figure 15:
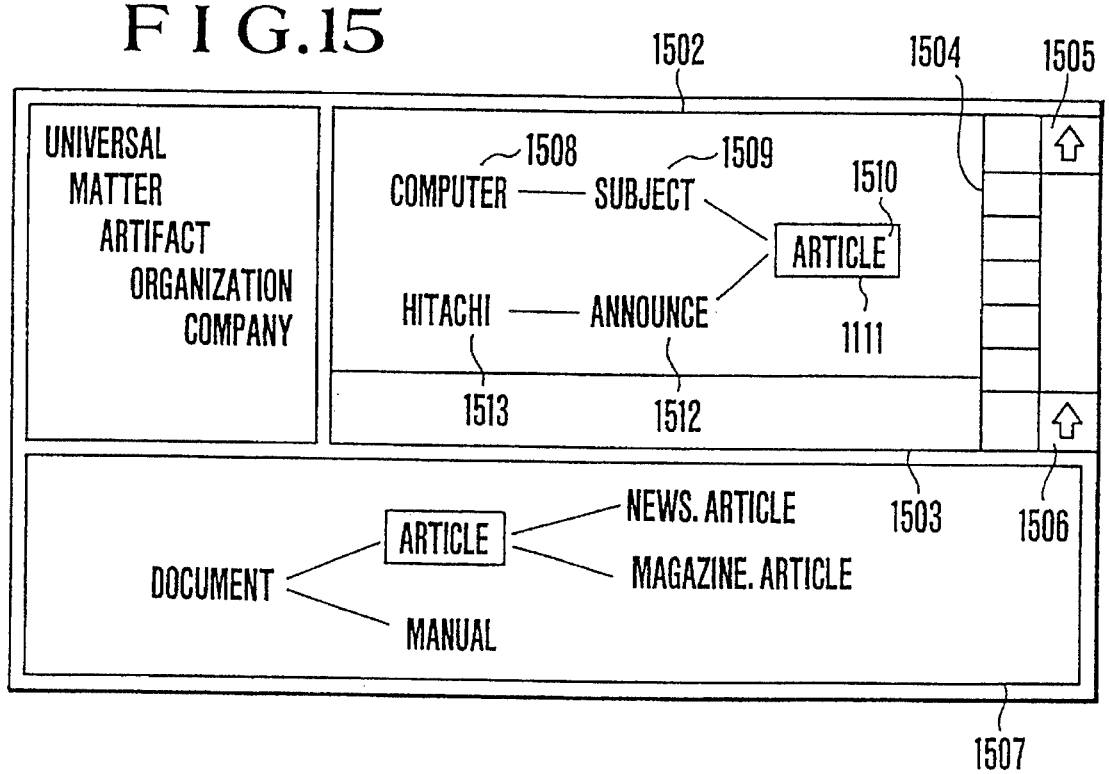
FIG. 15 illustrates a screen on which a concept is retrieved.
Figure 16:
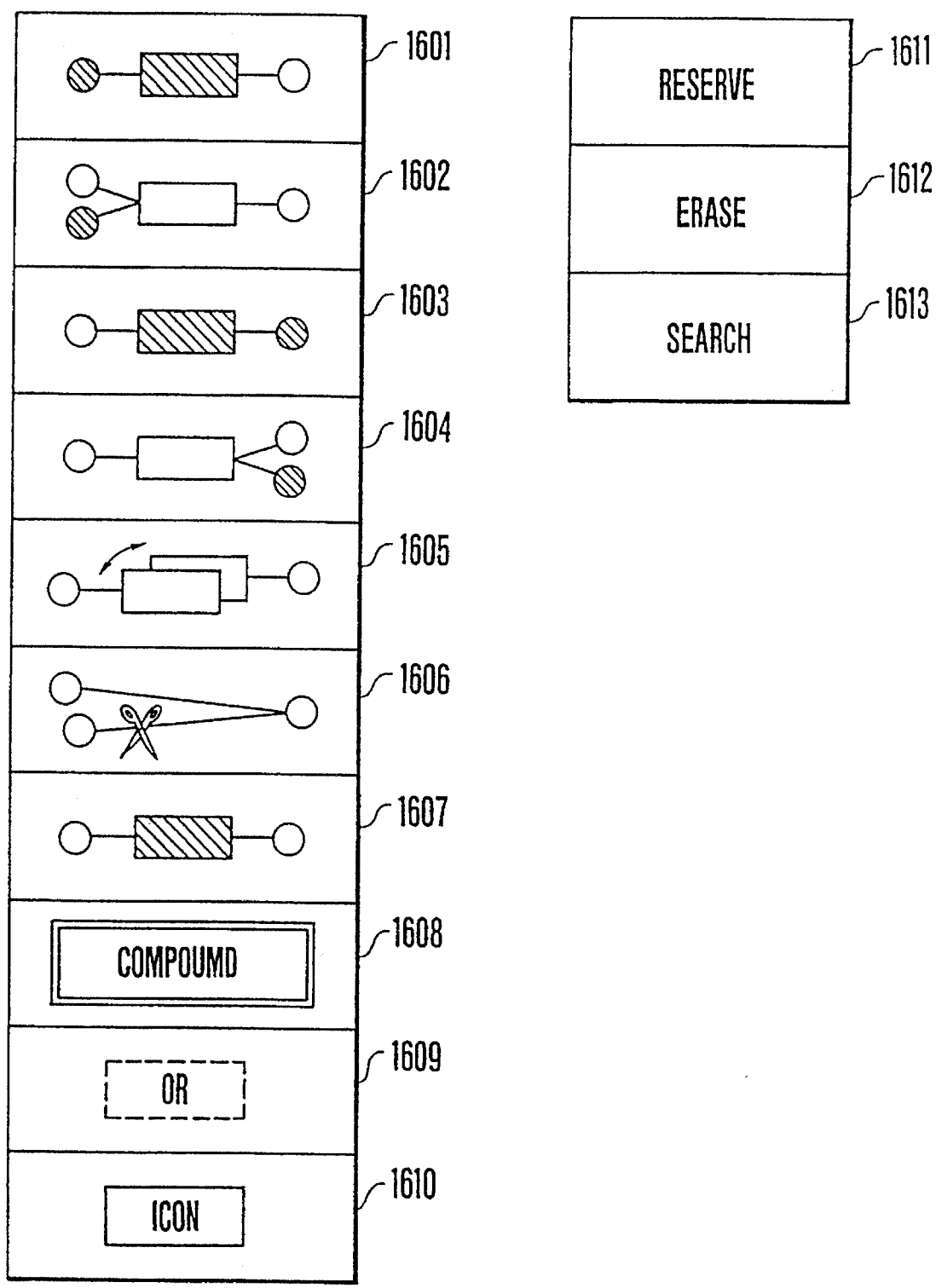
FIG. 16 shows items of a menu for preparing a retrieval sentence.
Figure 21:
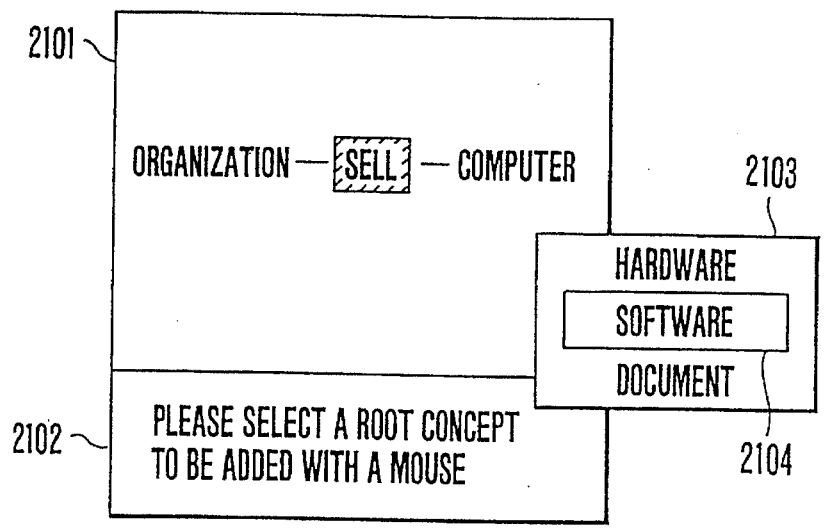

The principles and operation of a retrieval apparatus in an embodiment of the present invention will now be described. FIG. 15 shows a picture of interactive windows for the user used for concept retrieval. The windows are a window 1501 for display of a superconcept for the current concept, a diagrammatic query edition/diagram window 1502, a system message window 1503, a menu window 1504 for a query edition, an icon for displaying next menu 1505, an icon for displaying previous menu 1506, and a concept tree window 1507 for a concept corresponding to query editions. A menu for creating query editions consists of 13 items (1601–1613) as shown in FIG. 16 and only 5 items are displayed in the menu window 1504. This menu is capable of displaying the next five menu items using the next menu display icon 1505, and the previous six menu items using the previous menu display icon 1506. A pointer (a square frame) is attached to the current concept in a query edition. An anchor for a concept depending on a relation should hereinafter be understood as being an anchor concept relatable by the relation to another concept. For example, in FIG. 3, an anchor for "2050" depending on relation "DEVELOPMENT" is "HARDWARE" 310.

Query edition/diagram window 1502 which contains the current concept displays the query edition "ARTICLE PUBLISHED BY HITACHI, LTD., AND WHOSE SUBJECT IS COMPUTER". The "ARTICLE" 1510 is expressed in the S equation of LISP as follow:

(C#1 ARTICLE 1 ARTICLE (UNIVERSAL DOCUMENT) (X1 Y1) (SUBJECT 1 PUBLICATION 1) (NIL)

In the S equation, the first element "C#1" is a number inherent to the concept "ARTICLE", the second element ""ARTICLE 1" is the descriptor for "ARTICLE" 1510, and the third element "ARTICLE" is the concept name of "ARTICLE" 1510. The element "UNIVERSAL" in the list of fourth elements is an anchor depending on a relation attached as a root, and "DOCUMENT" is an anchor depending on a relation attached as conditions. The fifth element (X1 Y1) is the coordinates of the "ARTICLE" 1510, the element "SUBJECT 1" in the list of six elements is the descriptor of the relation "SUBJECT" 1510 attached as the conditions of the "ARTICLE 1510, and the "PUBLICATION 1" is the descriptor of the relation "PUBLICATION" 1512 attached as the conditions of "ARTICLE" 1510. Similarly, the seventh element denotes a list of elements which include the descriptor of the relation attached as a root. (Here, since "ARTICLE" has no root, the seventh element is expressed as NIL.) The reason why the descriptors are used is to identify a plurality of the same concepts in a query edition, if any. The "SUBJECT" 1509 is expressed in the S equation of LISP in the following form:

(R#1 SUBJECT 1 SUBJECT (X1' Y1') COMPUTER 1) (ARTICLE 1))

where the first element "R#1" is a number inherent to the relation "SUBJECT", the second element "SUBJECT 1" is the descriptor of the "SUBJECT" 1509, the third element "SUBJECT" is the relation name of "SUBJECT" 1509, the fourth element (X1' Y1') represents the coordinates of "SUBJECT" 1509, the fifth element "COMPUTER 1" is the descriptor of the left concept "COMPUTER" 1508 of "SUBJECT" 1509, and the sixth element "ARTICLE 1" is the descriptor of the right concept "ARTICLE" 1510 of "SUBJECT" 1509.

If the item 1613 shown in FIG. 16 is selected with the mouse from query edition menu window 1504, and "ARTICLE" 1510 is then selected with the mouse, the attached relations are known from the sixth element of the S equation for "ARTICLE" 1510. Thereafter, from the fifth element of the S equation for each of the relations, the concept connected by that relation is known. These processes are repeated so as to form a list representing the query edition "ARTICLE PUBLISHED BY HITACHI, LTD., AND WHOSE SUBJECT is computer" as follows:

```
(ARTICLE
    (SUBJECT (COMPUTER))
    (ANNOUNCE (HITACHI, LTD.))
``` and to retrieve the knowledge base.

If the item 1605 shown in FIG. 16 is selected with the mouse from query edition menu window 1504, and "SUBJECT" 1509 is then selected with the mouse, sets of concepts and relations which are attachable as conditions to the respective concepts (here, "ARTICLE") in the list of six elements of the S equation of "SUBJECT" 1509 are checked, sets common to those concepts and relations are extracted, the anchors for the relation "SUBJECT" of the respective concepts (here, "COMPUTER") in the list of fifth elements of the S equation of "SUBJECT" 1509 are checked, concepts are extracted from the extracted sets of relations and concepts, the anchors of which are subconcepts for the concepts, and a list of those relations are displayed as a menu.

Assume that the relation between "ARTICLE" 1510 and "HITACHI, LTD.", 1513 is obscure and hence that the depth is designated as 2. In that case, first, sets of "ARTICLE", relations and conditionable concepts are checked to extract the sets which include concepts relatable to "HITACHI, LTD.", the respective concepts and relations are added as the conditions of the "ARTICLE", the concepts are related by "HITACHI, LTD." and relations to create a query edition, and retrieval is effected. For example, there are the concept "HARDWARE" and the relation "REFERS TO" as the set of conditionable concepts and relations in the "ARTICLE" to satisfy the above conditions. In that case, "HARDWARE" and "HITACHI, LTD." are related by "DEVELOPED", "SOLD", etc., expanded to the query editions "ARTICLE WHICH REFERS TO HARDWARE DEVELOPED BY HITACHI, LTD." and "ARTICLE WHICH REFERS TO HARDWARE SOLD BY HITACHI, LTD.", respectively, and retrieval is effected.

The present invention will now be described with respect to FIGS. 17–64. In FIGS. 17–51, only the query edition/ diagram window and the system message window are displayed. The relationship between the superconcept window for display of a superconcept for a current concept in the process for creating query editions and the concept tree window is similar to that described in Japanese Patent Publication JP-A SHO 62-297568 filed by the same applicant.

Assume first that the current query edition is as shown in FIG. 17. If an item 1601 is selected with the mouse from the menu window of FIG. 16, "PLEASE SELECT A CONDITIONED CONCEPT FROM QUERY EDITIONS." is displayed in the system message window 1702. If "COMPUTER" 1703 is selected with the mouse, a list of conditions attachable to "COMPUTER" is displayed as shown in FIG. 18. Thus, if the item "SOLD BY ORGANIZATION" 1802 is selected, the query edition is changed as shown in FIG. 19. It represents the inquery edition "COMPUTER SOLD BY ORGANIZATION". Unless it is determined which relation "COMPUTER" and other concepts are in, it is unclear, for example, which of "COMPUTER WHICH IS DEVELOPED BY HITACHI, LTD." and "COMPUTER WHICH RUNS ON OS WHICH IS DEVELOPED BY HITACHI, LTD." is due. If it is desired to express an obscure concept such as "COMPUTER RELATED TO HITACHI, LTD" the item "?" 1803 is selected from menu 1801. At this time, "PLEASE CENTER CONCEPT NAME AND DEPTH OF RELATION." is displayed in the system message window 1702, so that if, for example, "HITACHI, LTD." is entered and the depth is designated as 2 from the keyboard or the subsumption tree window, the query edition will be changed as shown in FIG. 20. The depth of 2 means that two or less relations are inserted between "HITACHI, LTD." and "COMPUTER". For example, "COMPUTER WHICH RUNS ON OS DEVELOPED BY HITACHI, LTD." is of a depth of 2, and "COMPUTER WHICH IS DEVELOPED BY HITACHI, LTD." is of a depth of 1. If "COMPUTER" 2003 is to be retrieved, all the relations combineable by the relation name are assigned.

Figure 22:
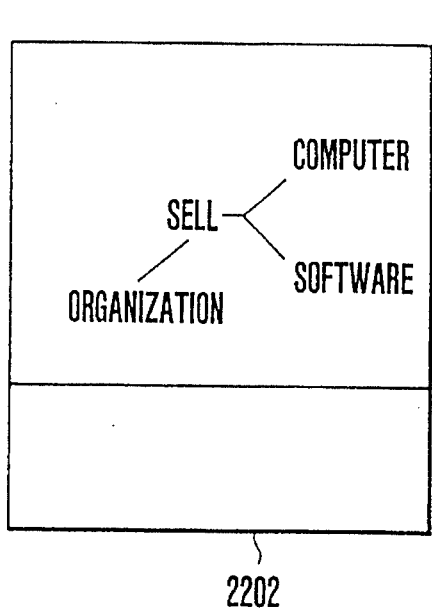
Figure 23:
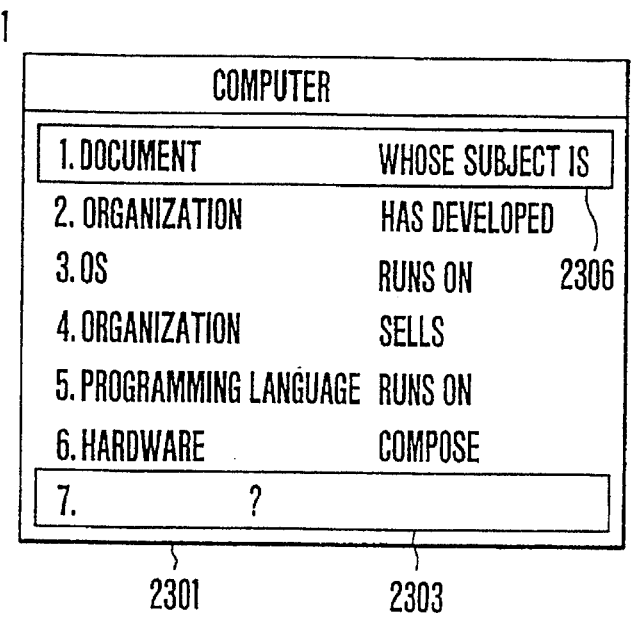
Figure 24:
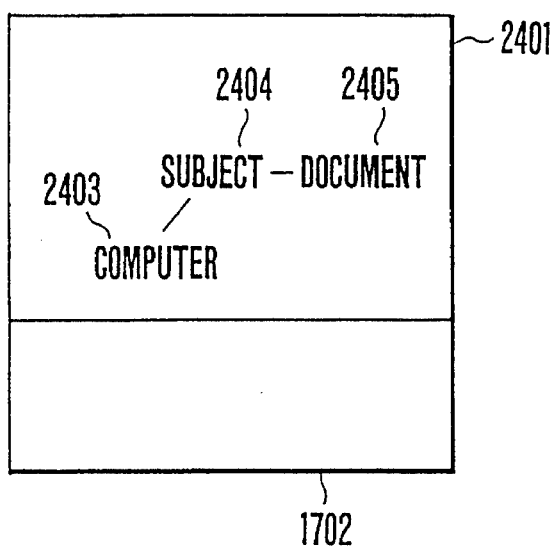
Figure 25:
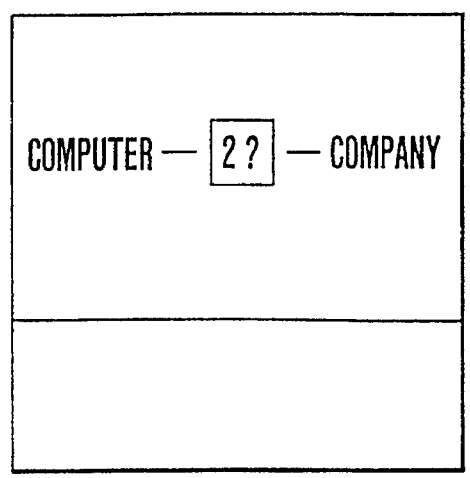
Figure 26:
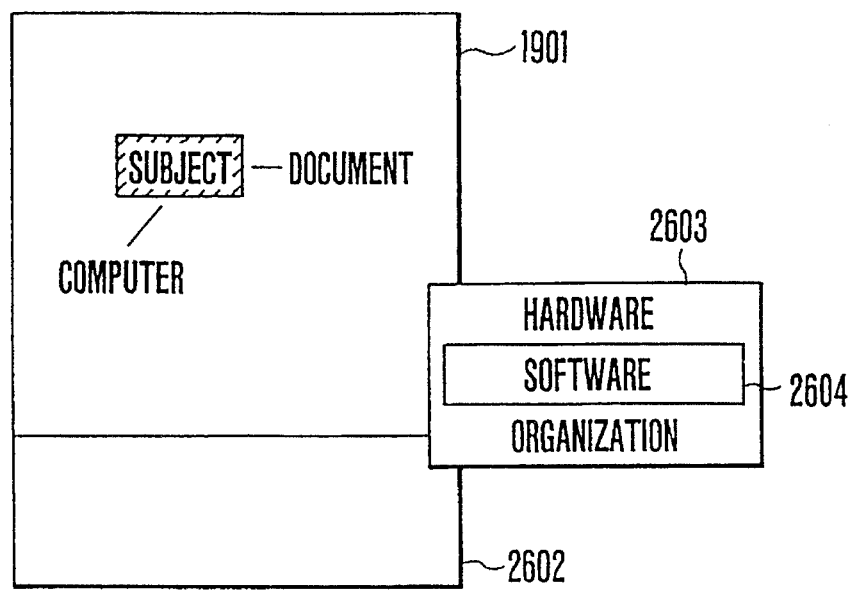

In FIG. 19, if an item 1604 is selected from the menu window of FIG. 16, "PLEASE SELECT WITH MOUSE A RELATION TO ATTAH A ROOT CONCEPT." is displayed in system message window 1902. Thus, if "SELL" 1904 is selected with the mouse from the query editions, a list of concepts related to "ORGANIZATION" by relations "SOLD BY" is displayed in menu 2103 of FIG. 21. Thus, if, for example, the item "SOFTWARE" 2104 is selected with the mouse, the query editions are changed as shown in FIG. 22. It represents two query editions "COMPUTER WHICH IS SOLD BY ORGANIZATION" and "SOFTWARE SOLD BY ORGANIZATION." If an item 1603 is selected with the mouse from the menu display window in FIG. 17. "PLEASE SELECT WITH MOUSE A CONCEPT TO ATTACH A ROOT." is displayed in system message window 1702. Thus, if "COMPUTER" 1703 is selected with the mouse, a set of concepts and relations which can attach a root to "COMPUTER" is displayed in a list as shown in FIG. 23. Therefore, item "DOCUMENT WHOSE SUBJECT IS." 2302, for example, is selected, and the query edition is changed as shown in FIG. 24. It represents the query edition "DOCUMENT WHOSE SUBJECT IS COMPUTER". If a "COMPANY" whose relation to "COMPUTER" is not clear is desired to be designated as a root concept, item "?" 2303 is selected with the mouse, "COMPANY" is entered from the keyboard or the subsumption tree window, and the depth is designated, for example, as 2, the query edition will be changed as shown in FIG. 25.

Figure 27:
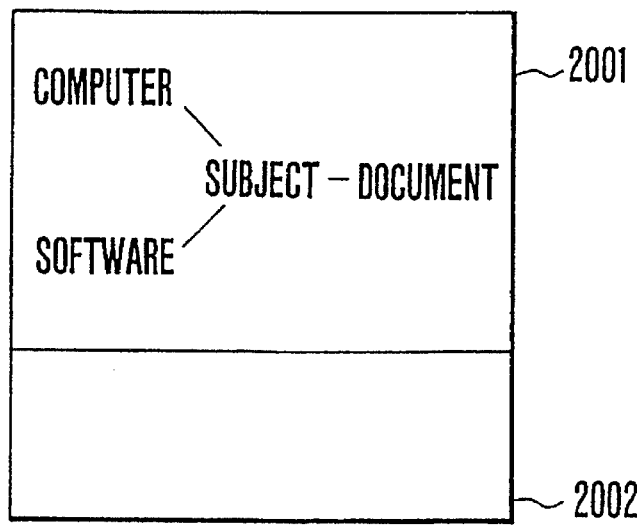
Figure 28:
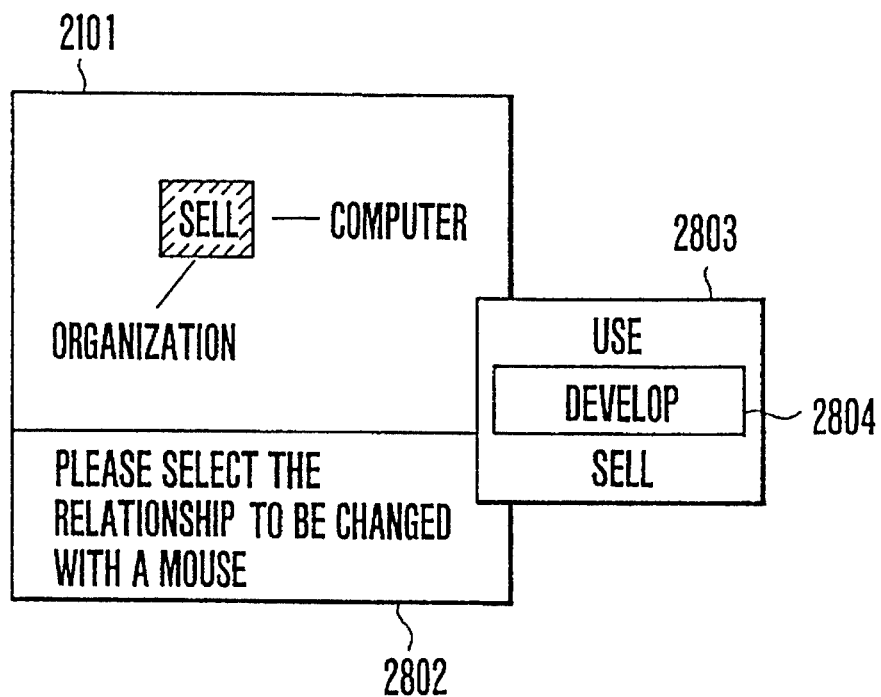

If, in FIG. 24, item 1602 is selected with the mouse from the menu display window, "PLEASE SELECT WITH MOUSE RELATION TO ATTACH CONCEPT AS CONDITIONS." is displayed in system message window 2402. Thus, if, for example, "SUBJECT" 2404 is selected with the mouse, a list of concepts which are related to "DOCUMENT" by the relation "SUBJECT" is displayed in menu 2603 shown in FIG. 26. Therefore, if "SOFTWARE" 2604, for example,is selected with the mouse, the query edition is changed as shown in FIG. 27. It represents the query edition "DOCUMENT WHOSE SUBJECT IS SOFTWARE AND COMPUTER".

Figure 29:
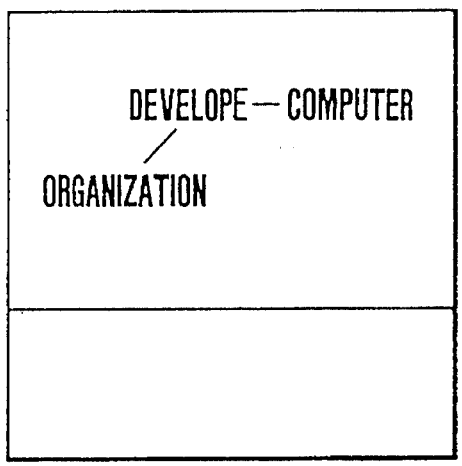

In FIG. 19, if item 1605 is selected with the mouse from the menu window, "PLEASE SELECT WITH MOUSE A RELATION TO BE CHANGED." is displayed in system message window 1902, so that if "SELL" 1904 is, for example, selected, a list of relations which relate "ORGANIZATIONS" and "COMPUTER" to each other is displayed in menu 2803. Thus, if "DEVELOPS" 2804 shown in FIG. 28, for example, is selected with the mouse, the query edition is changed as shown in FIG. 29.

Figure 30:
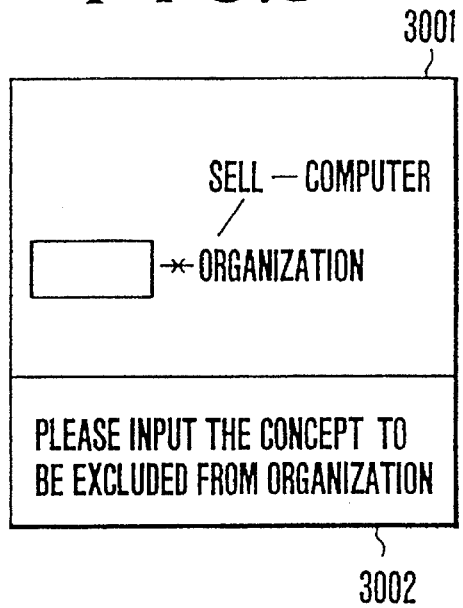
Figure 31:
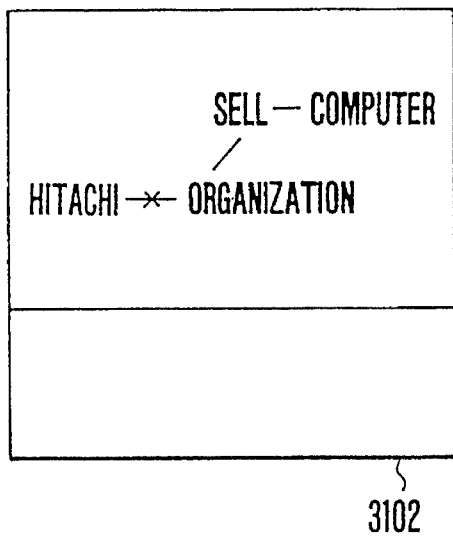

In FIG. 19, if item 1606 is selected with the mouse from the menu display window, "PLEASE SELECT WITH MOUSE CONCEPTS EXCLUDING A PARTICULAR CONCEPT." is displayed in system message window 1902. Thus, if, for example, "ORGANIZATION" 1903 is selected with the mouse, the picture changes as shown in FIG. 30, so that the menu selects the appropriate concept by keying in data at the keyboard or with the mouse in the subsumption tree window to designate the concept to be excluded. If "HITACHI, LTD.", for example, is designated, the query edition is changed as in FIG. 31. It represents the query edition "COMPUTER SOLD BY ORGANIZATIONS EXCLUDING HITACHI, LTD."

Figure 32:
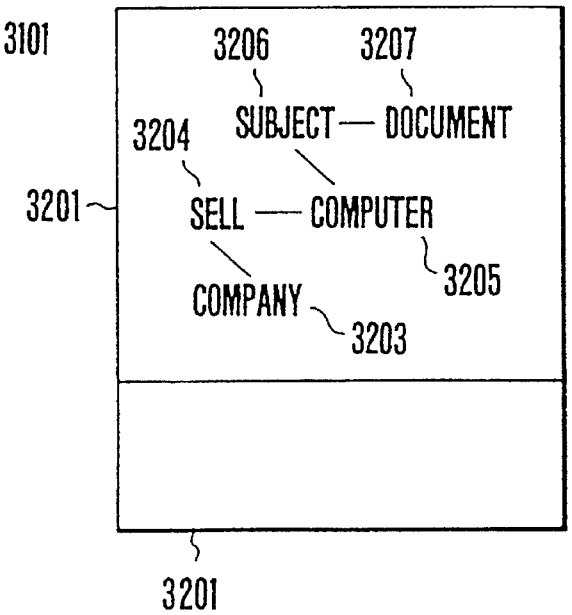
Figure 33:
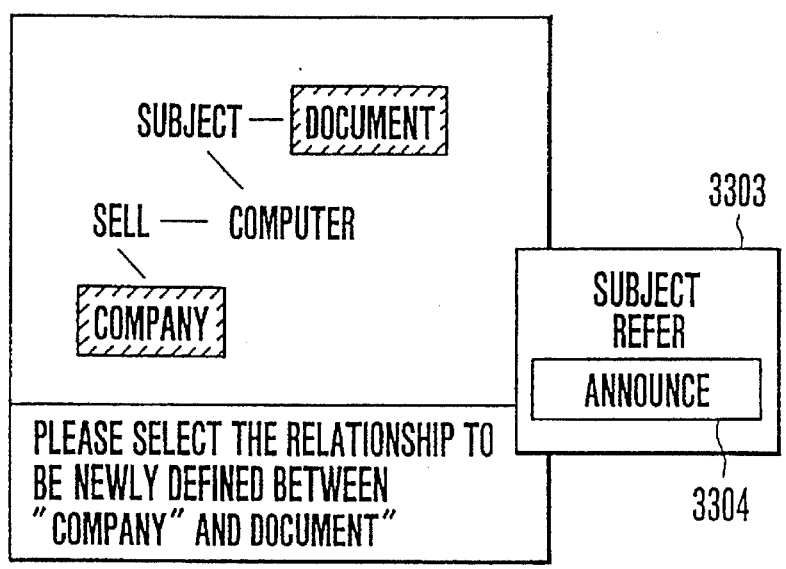
Figure 34:
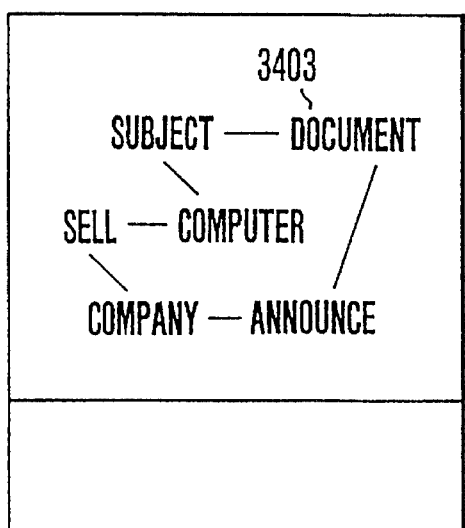

If item 1607 is selected with the mouse from the menu window in FIG. 32, "PLEASE SELECT TWO CONCEPTS IN THE QUERY EDITION TO BE COMBINED BY A RELATION." is displayed in system message window 3202. Thus, if "DOCUMENT" 3207 and "COMPANY" 3203, for example, are selected with the mouse, a list of relations between the "DOCUMENT" and "COMPANY" is displayed in menu 3303 in FIG. 33. Therefore, if, for example, "ANNOUNCED BY" 3304 is selected with the mouse, the query edition is changed as shown in FIG. 34. It represents the query edition "DOCUMENT ANNOUNCED BY B COMPANY AND WHOSE SUBJECT IS COMPUTER SOLD BY THE COMPANY."

Figure 35:
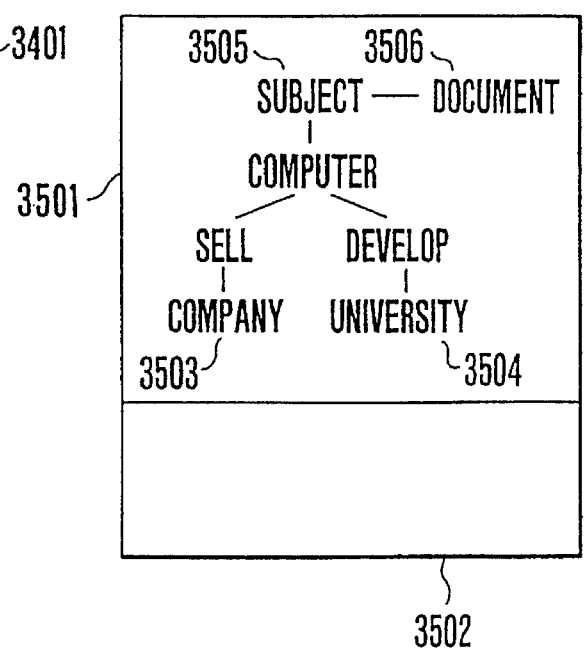
Figure 36:
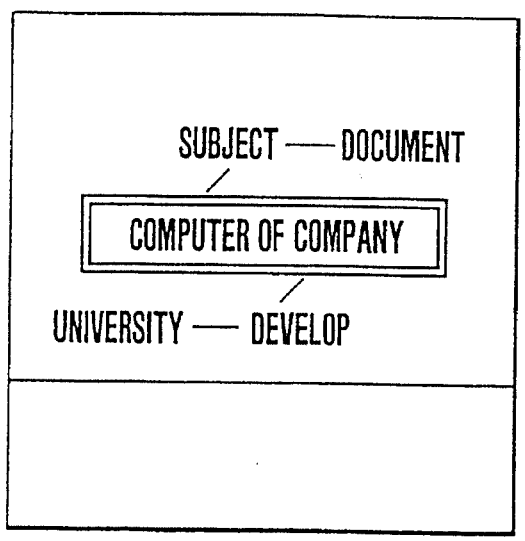
Figure 37:
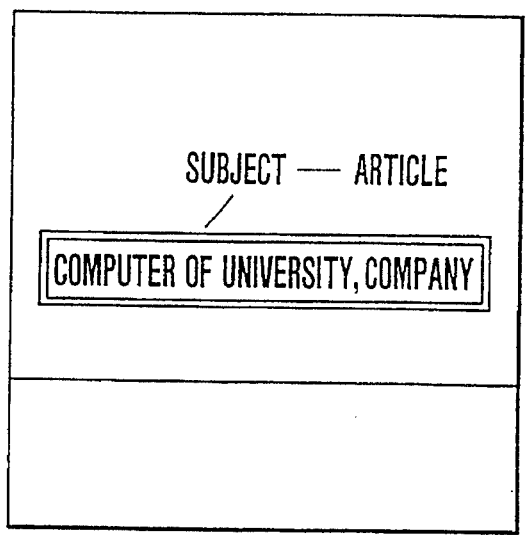

Assume that the query edition "DOCUMENT WHOSE SUBJECT IS COMPUTER DEVELOPED BY UNIVERSITY AND SOLD BY COMPANY." is displayed in query edition/diagram display window 3501 of FIG. 35. If item 1608 is selected with the mouse from the menu window, "PLEASE SELECT WITH MOUSE CONDITIONS AND CONCEPT TO BE EXPRESSED AS NOMINAL COMPOUND." is displayed in system message window 3502. Accordingly, if, for example, "COMPUTER" 3505 and then "COMPANY" 3503 are selected with the mouse, the query edition is changed as shown in FIG. 36. If "COMPUTER" 3605 is selected and "COMPANY" 3503 and "UNIVERSITY" 3504 are then selected with the mouse, the query edition is changed as shown in FIG. 37. If "DOCUMENT" 3606 and then "COMPANY" 3603 are selected, the nominal compound "COMPANY COMPUTER DOCUMENT" is produced. Since conditions are attached to "COMPUTER" 3505, the nominal compound "COMPUTER DOCUMENT" is not produced even if "DOCUMENT" 3506 is selected and the "COMPUTER" 3505 is selected.

Figure 38:
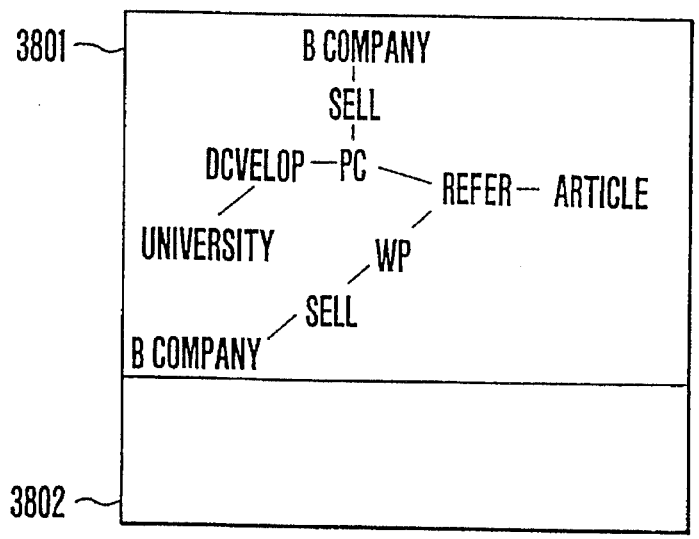
Figure 39:
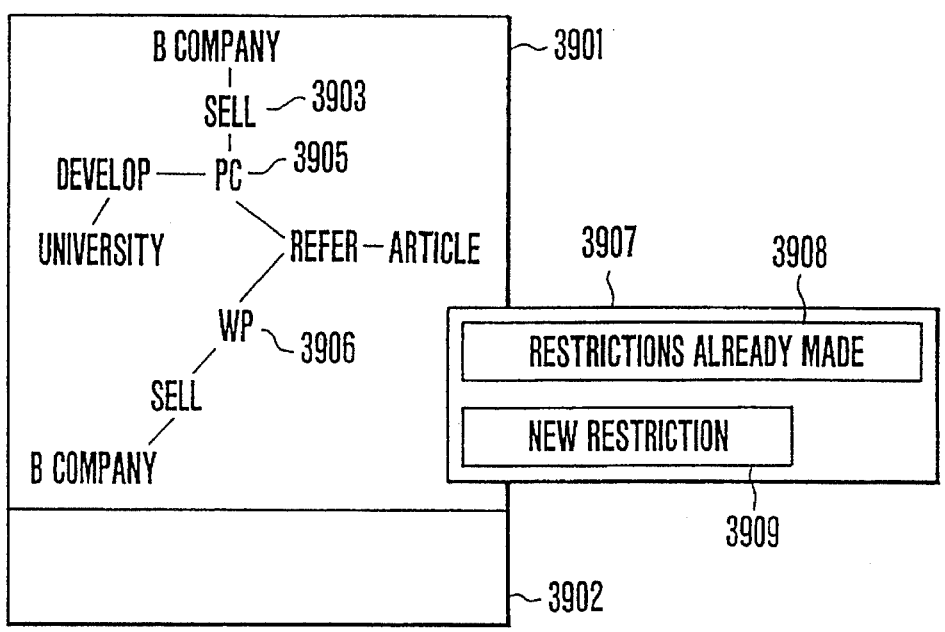
Figure 40:
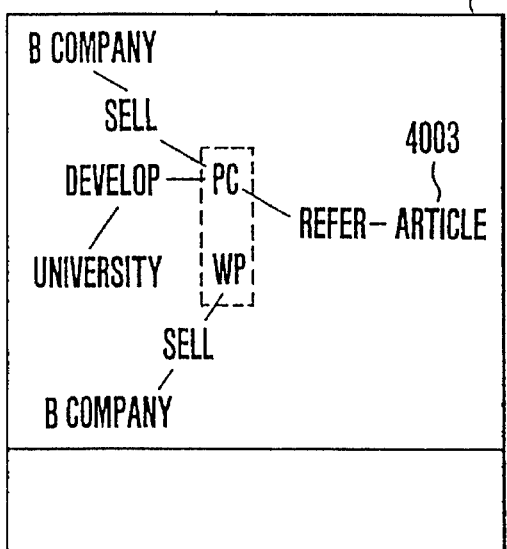
Figure 41:
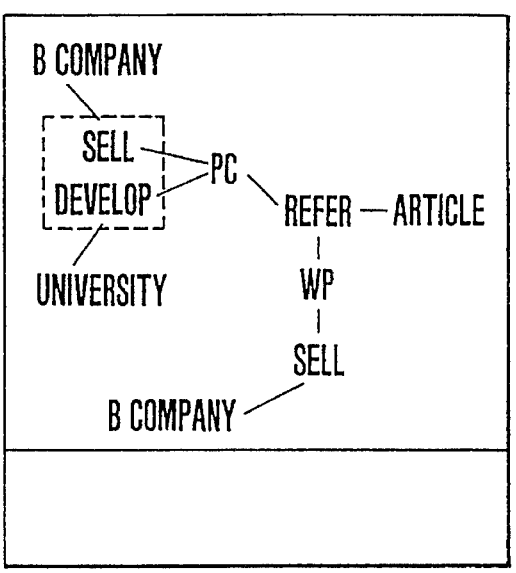
Figure 42:
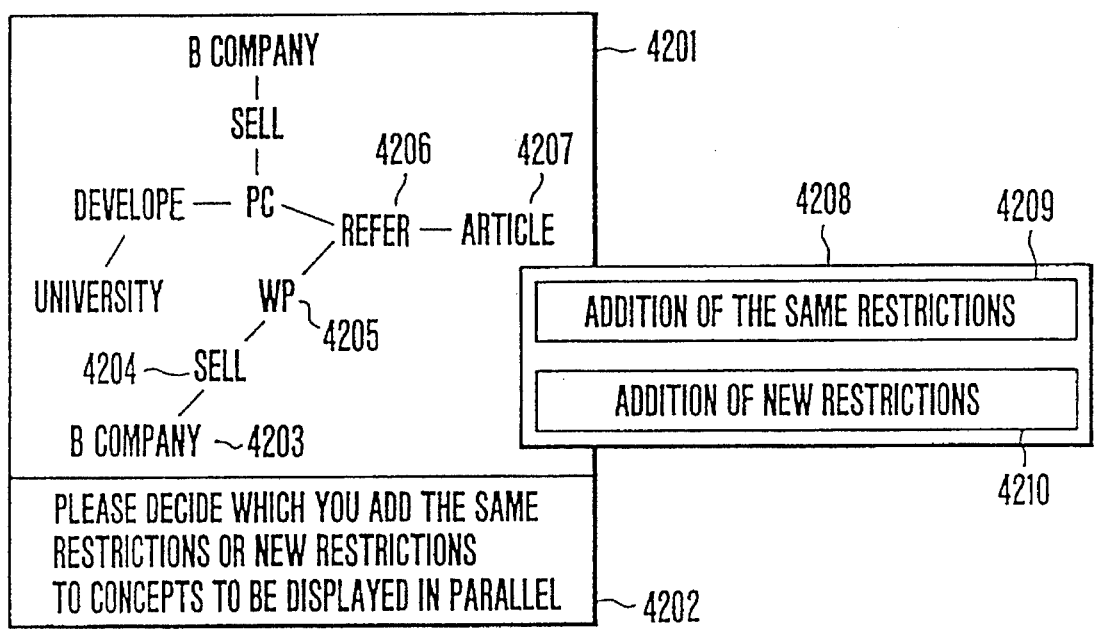
Figure 43:
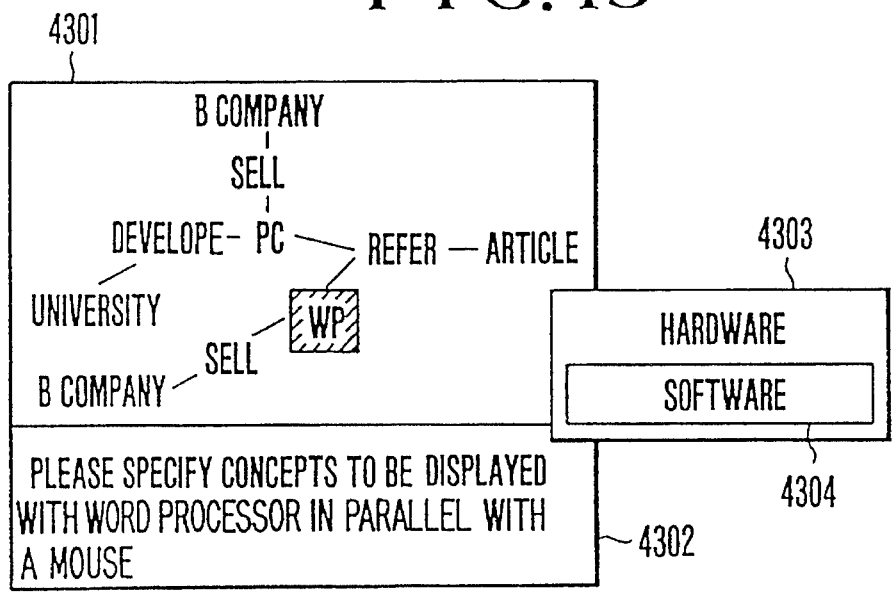
Figure 44:
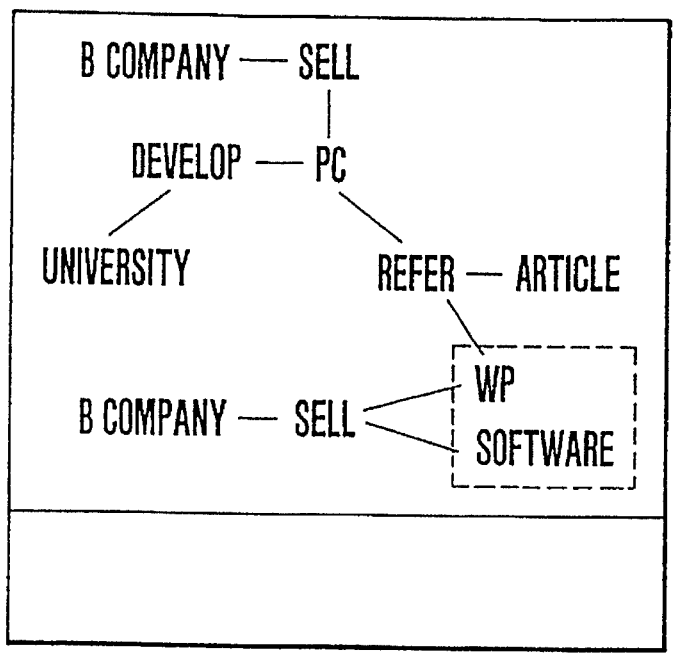
Figure 45:
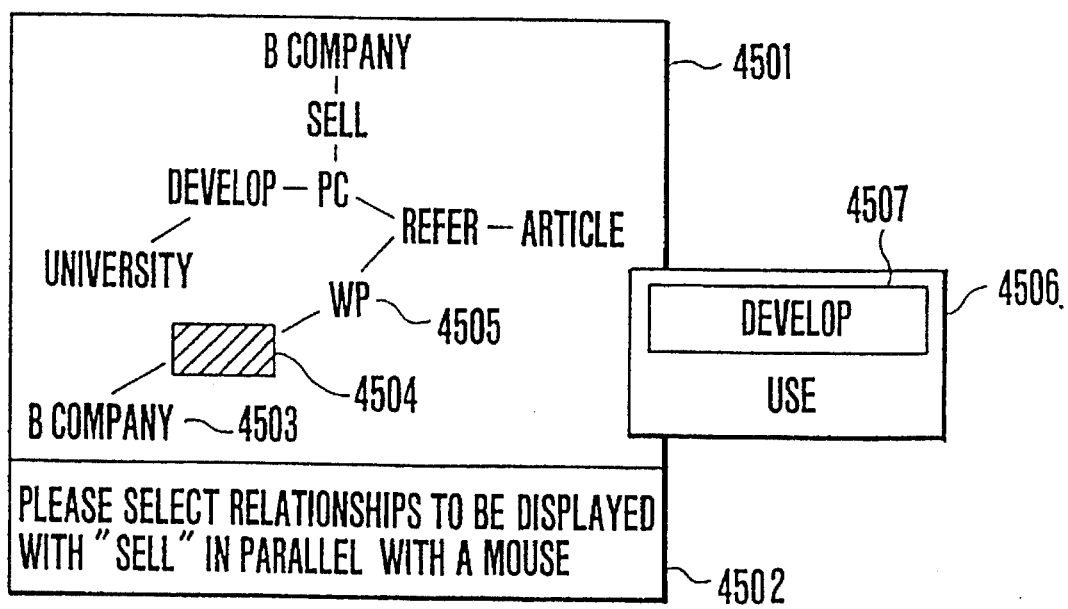
Figure 46:
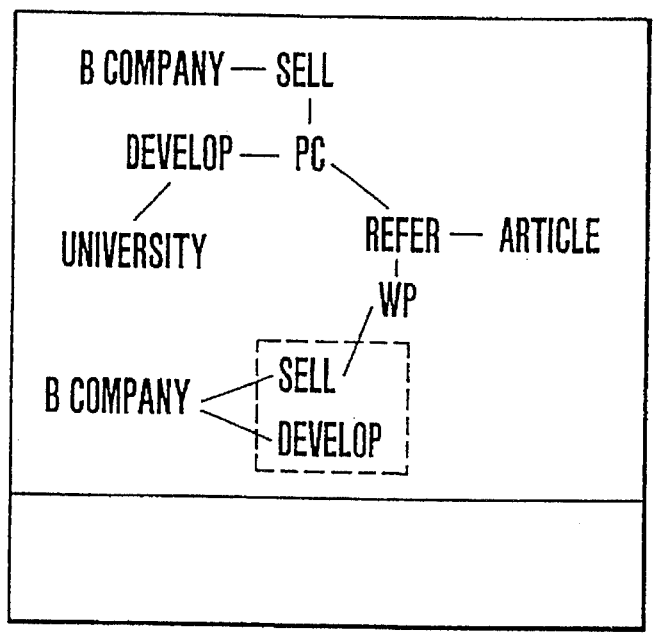
Figure 47:
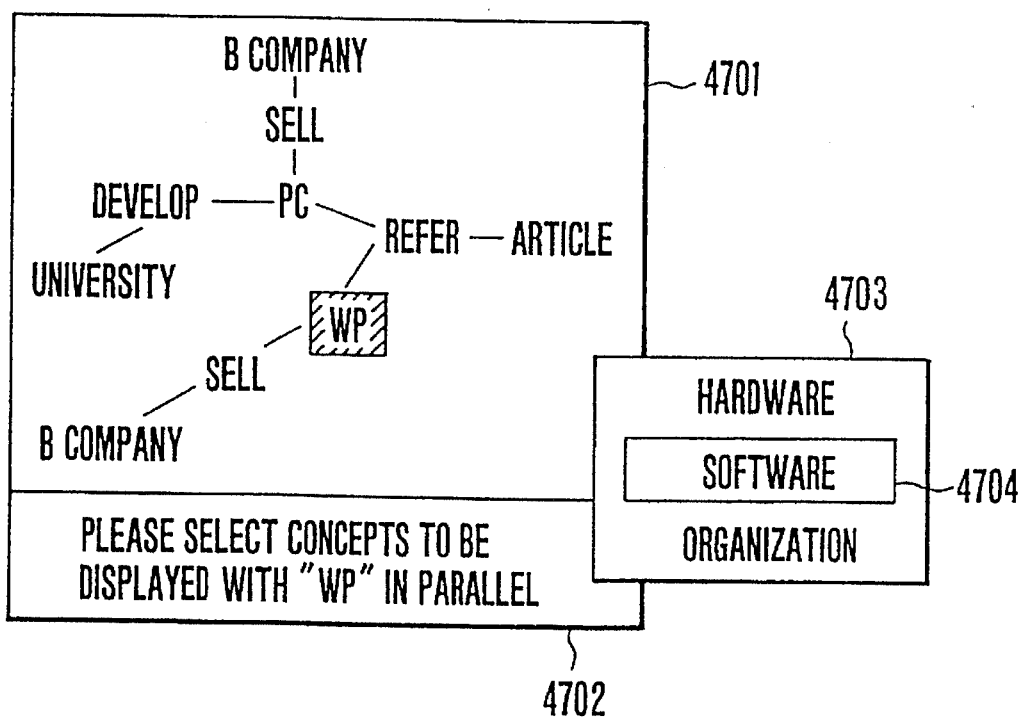
Figure 48:
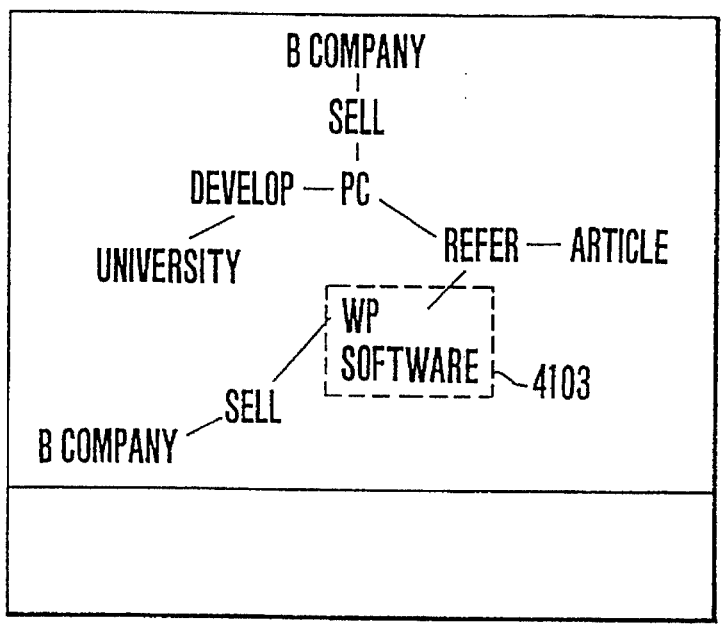
Figure 49:
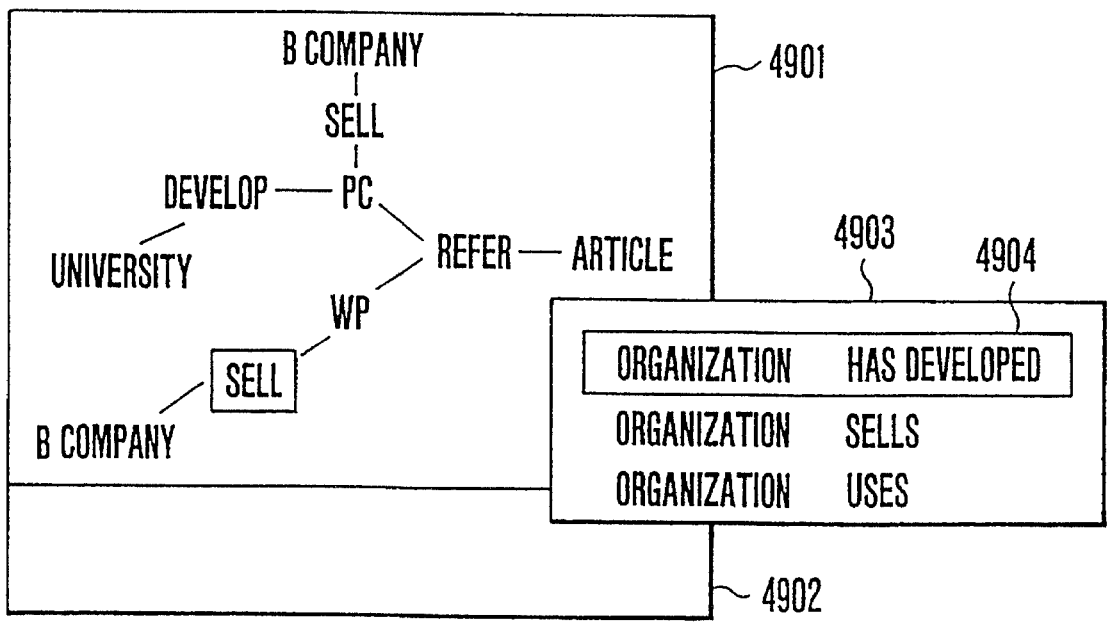
Figure 50:
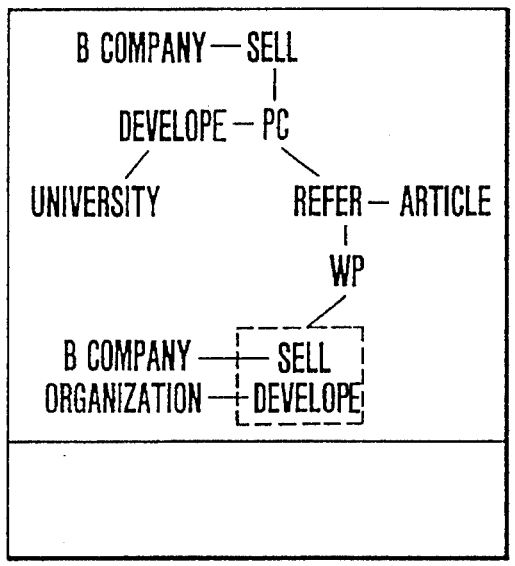

Assume that the query edition "DOCUMENT WHICH REFERS TO PERSONAL COMPUTER SOLD BY "B COMPANY" AND DEVELOPED BY UNIVERSITY, AND WORD PROCESSOR SOLD BY "B COMPANY"." is displayed in query edition/diagram display 3801 of FIG. 38. If item 1609 is selected from the menu window with the mouse, menu 3907 is displayed as shown in FIG. 39 and "PLEASE SELECT ONE OF "DESCRIBE SPECIFIED RESTRICTIONS IN PARALLEL", and "DESCRIBE A SPECIFIED RESTRICTION AND A NEW RESTRICTION IN PARALLEL."." is displayed in system message window 3902. If item "SPECIFIED RESTRICTIONS" 3908 is selected by the mouse, "PLEASE SELECT WITH MOSUE FROM QUERY EDITIONS RELATIONS OR CONCEPTS DESCRIBED IN PARALLEL." is displayed in system message window 3902. Therefore, if, for example, "PERSONAL COMPUTER" 3905 and "WORD PROCESSOR" 3706 are selected with the mouse, the query edition is changed as shown in FIG. 40. It represents the query edition "ARTICLE WHICH REFERS TO PERSONAL COMPUTER SOLD BY "B COMPANY" AND DEVELOPED BY UNIVERSITY, OR WORD PROCESSOR SOLD BY "B COMPANY".". If, in FIG. 39, item "RESTRICTIONS ALREADY MADE" 3908 is selected similarly with the mouse from menu 3907, and "SELL" 3903 and "DEVELOP" 3404 are than selected with the mouse, the query edition is changed as shown in FIG. 41. It represents the query edition "ARTICLE WHICH REFERS TO PER-SONAL COMPUTER SOLD BY "B COMPANY" OR DEVELOPED BY UNIVERSITY, AND WORD PROCESSOR SOLD BY "B COMPANY"". If item "NEW RESTRICTION" 3909 is selected from menu 3907 in FIG. 39, menu 4208 is displayed as shown in FIG. 42, "PLEASE DECIDE WHICH YOU ADD TO CONCEPTS TO BE DISPLAYED IN PARALLEL, THE SAME RESTRICTIONS OR NEW RESTRICTIONS." is displayed in system message window 4202. If item "ADDITION OF THE SAME RESTRICTIONS" 4209 is then selected with the mouse, "PLEASE SELECT FROM QUERY EDITIONS RELATIONS OR CONCEPTS DESCRIBED IN PARALLEL." is displayed in system message window 4202. Thus, if for example, "WORD PROCESSOR" 4205 is selected with the mouse, a list of concepts which are related by the concept "B COMPANY" and the relation "SOLD BY", or by the concept "ARTICLE" and the relation "REFERS TO", is displayed in menu 4303. If "SOFTWARE" 4304 is here selected with the mouse, the query edition is changed as shown in FIG. 44. It represents the query edition "ARTICLE WHICH REFERS TO PERSONAL COMPUTER SOLD BY "B COMPANY" AND DEVELOPED BY UNIVERSITY, AND WORD PROCESSOR OR SOFTWARE SOLD BY "B COMPANY"." If, in FIG. 35, item "ADDITION OF THE SAME RESTRICTIONS" 4209 is selected with the mouse from menu 4208 and then "SELL" 4204 is designated with the mouse in FIG. 35, the relationship between "B COMPANY" and "WORD PROCESSOR" is displayed in menu 4506, as shown in FIG. 45. Thus, if, for example, item "DEVELOP" 4507 is selected with the mouse, the query edition is changed as shown in FIG. 46. It represents the query edition "ARTICLE WHICH REFERS TO PERSONAL COMPUTER SOLD BY "B COMPANY" AND DEVELOPED BY UNIVERSITY, AND WORD PROCESSOR SOLD OR DEVELOPED BY "B COMPANY"". If item "ADDITION OF NEW RESTRICTIONS" 4210 is selected with the mouse from menu 4208 in FIG. 42, "PLEASE SELECT FROM QUERY EDITIONS CONCEPTS OR RELATIONS TO BE DISPLAYED IN PARALLEL." is displayed in system message 4202. Accordingly, if, for example, "WORD PROCESSOR" 4205 is selected with the mouse, a list of concepts related by the concept "ARTICLE" and the relation "REFERRED TO" is displayed in menu 4703. Therefore, if, for example, item "SOFTWARE" 4704 is selected with the mouse, the query edition is changed as shown in FIG. 48. It represents the query edition "ARTICLE WHICH REFERS TO PER-SONAL COMPUTER SOLD BY "B COMPANY" AND DEVELOPED BY UNIVERSITY, AND WORD PROCESSOR OR SOFTWARE SOLD BY "B COMPANY"" . If item "ADDITION OF NEW RESTRICTIONS" 4210 is similarly selected with the mouse from menu 4208 and "SELL" 4204 is then selected with the mouse in FIG. 35, a list of relations and concepts which can add restrictions to "WORD PROCESSOR" is displayed in menu 4903 as shown in FIG. 42. Therefore, if, for example, item "DEVELOPED BY ORGA-NIZATION" 4904 is selected with the mouse, the query edition is changed as shown in FIG. 43. It represents the query edition "ARTICLE WHICH REFERS TO PER-SONAL COMPUTER SOLD BY "B COMPANY" AND DEVELOPED BY UNIVERSITY, AND WORD PROCES-SOR SOLD BY "B COMPANY" OR DEVELOPED BY ORGANIZATION".

Figure 51:
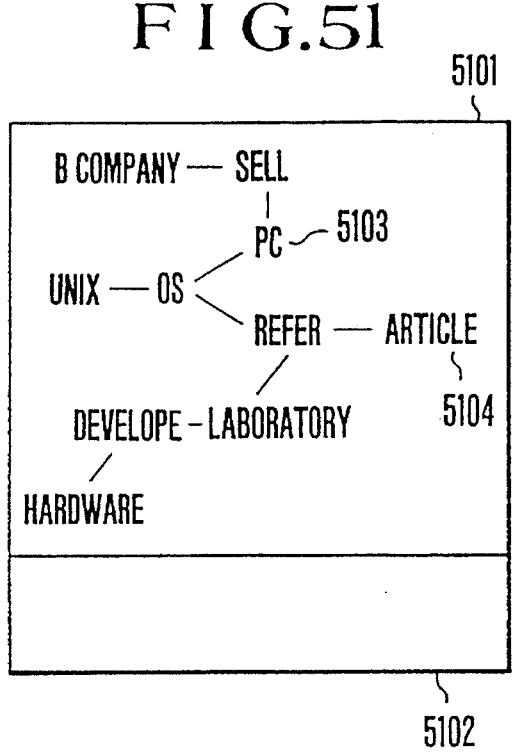
Figure 52:
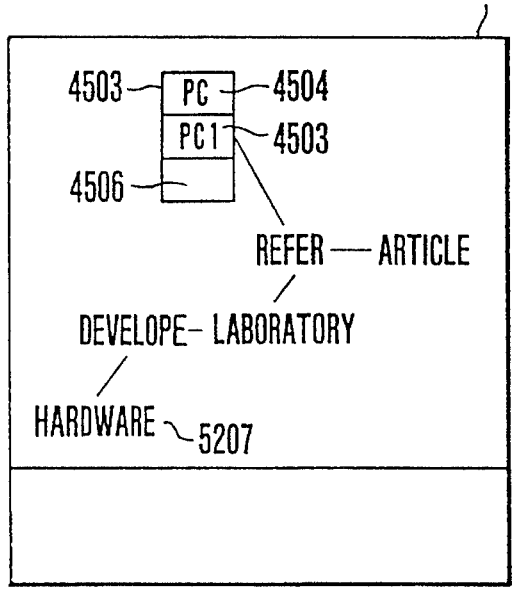
Figure 53:
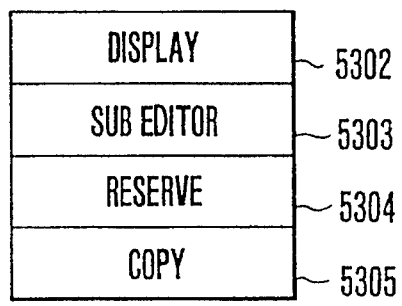
Figure 54:
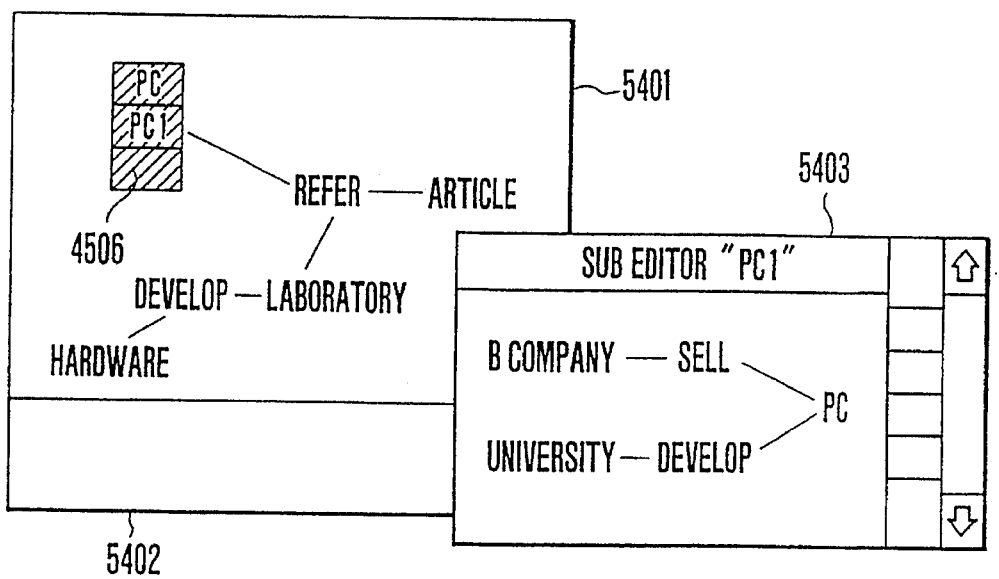
Figure 55:
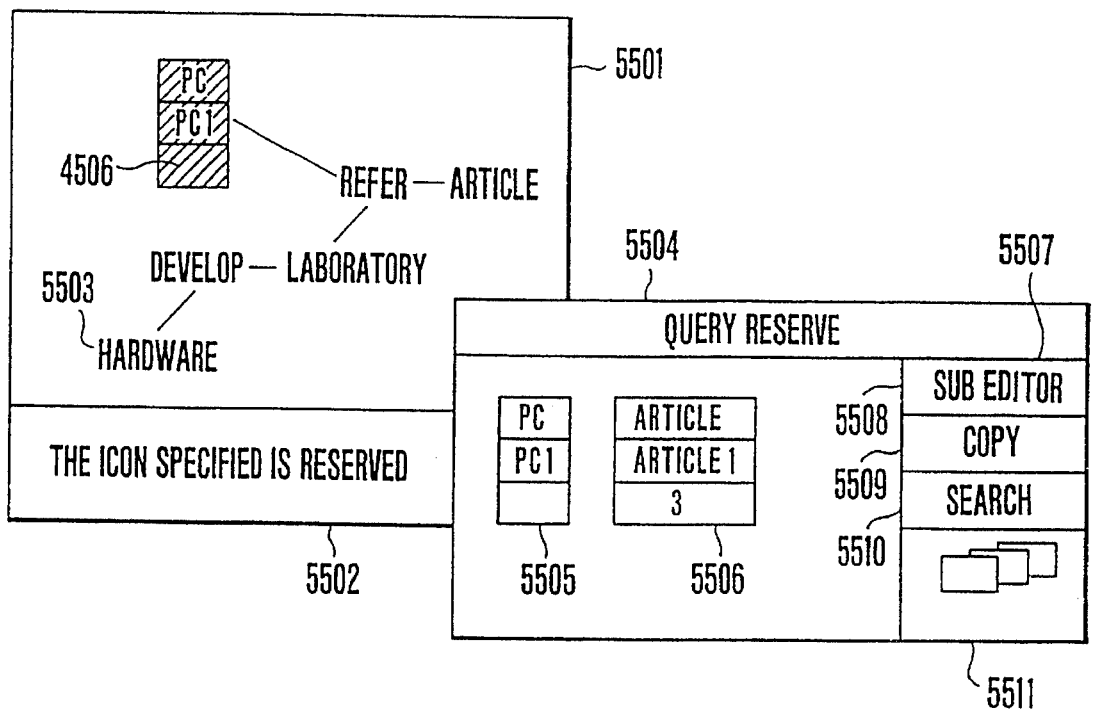
Figure 56:
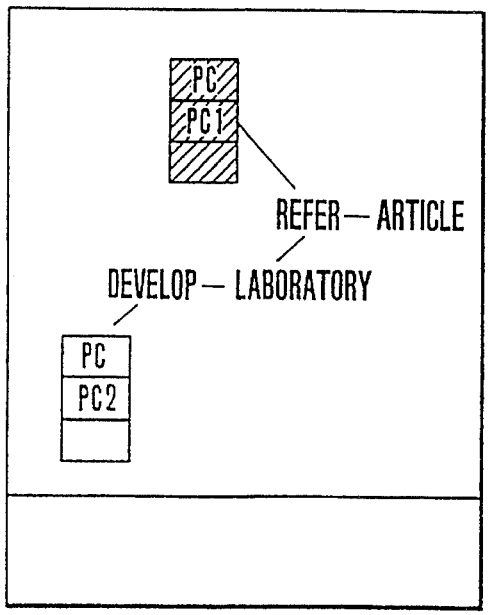

If item 1610 is selected with the mouse from the menu display window in FIG. 51, "PLEASE DESIGNATE WITH MOUSE A CONCEPT TO BE CHANGED TO ICON." is displayed in system message window 5102. If, for example, "PERSONAL COMPUTER" 5103 is selected with the mouse, the query edition is changed as shown in FIG. 52. The icon 5203 represents "PERSONAL COMPUTER WHICH USES AS OS UNIX SOLD BY "B COMPANY"". Item 4504 displays a concept name represented by the icon; 4505, the descriptor of the appropriate concept; and 5206, the number of retrieved concepts. Item 4506 is displayed only when retrieval is effected. The menu displayed when icon 5203 is selected with the mouse in FIG. 52 is as shown by 5301 in FIG. 53. If item "DISPLAY" 5302 is selected with the mouse in menu 5301, the query edition of FIG. 52 is changed as shown in FIG. 51. If item "SUB EDITOR" 5303 is selected with the mouse in menu 5301, the concept represented by the icon is displayed on another editor 5403 as shown in FIG. 54, so that the user can use the menu of FIG. 16 to form query editions concerning the concept represented by the icon. If item "RESERVE" 5304 is selected with the mouse in menu 5301, a query edition reserve window "QUERY RESERVE" 5503 is displayed as shown in FIG. 55, and the designated icon is reserved as a new icon 5505. If item "SUB EDITOR" 5508 is selected with the mouse in menu 5507 of "QUERY RESERVE" 5504, "PLEASE SELECT WITH MOUSE AN ICON TO BE EDITED." is displayed in system message window 5502. Thus, if, for example, icon 5505 is selected with the mouse, an editor similar to editor 5303 is displayed, so that the appropriate concept may be edited. If item "COPY" 5509 is selected with the mouse, "PLEASE SELECT WITH MOUSE ICON TO BE COPIED." is displayed in system message window 5502. Thus, if, for example, icon 5505 is selected with the mouse, "PLEASE DESIGNATE COPY TARGET CONCEPT ON EDITOR WITH MOUSE." is displayed in system message window 5502, so that if "HARDWARE" 5503 is selected with the mouse, the query edition is changed as shown in FIG. 56. If the concept selected on the editor is not the superconcept for the concept indicated by the icon, it cannot be replaced with the icon, so that such fact is displayed in an error message. If item "SEARCH" 5510 is selected with the mouse, "PLEASE SELECT WITH MOUSE AN ICON TO BE SEARCHED." is displayed in system message window 5502, so that if, for example, icon 5506 is selected with the mouse, the appropriate "ARTICLE" is searched. If item 5511 is selected with the mouse, "PLEASE SELECT WITH MOUSE ICON WHICH DISPLAYS RESULT OF SEARCH." is displayed in system message window 5502, so that if icon 5506 is selected, a list of previous results of search is displayed as a separate picture as 6103 in FIG. 61. If item "COPY" 5305 is selected with the mouse in menu 5301, "PLEASE SELECT WITH MOUSE CONCEPT TO COPY ICON." is displayed in system message window 5202, so that if, for example, "HARDWARE" 5207 is selected with the mouse, the query edition of FIG. 52 is changed as shown in FIG. 56. Unless the concept selected with the mouse is a superconcept for the concept represented by the icon, as in the above case, the icon cannot be copied.

If item "RESERVE" 1611 is selected with the mouse from the menu window in FIG. 51, "PLEASE SELECT A CONCEPT TO BE RESERVED IN QUERY EDITION RESERVE AREA." is displayed in the system message window, so that if, for example, "PERSONAL COMPUTER" 5103 is selected with the mouse, "PERSONAL COMPUTER" and related conditions are shaded, and "IF THERE ARE RESTRICTIONS TO BE DELETED, PLEASE DESIGNATE THEM WITH LEFT MOUSE BUTTON AND CLICK RIGHT BUTTON." is displayed in system message window 5702. Thus, if, for example, "UNIX" 5703 or "OS" 5704 is selected with the left mouse button and the right button is clicked, the query edition "PERSONAL COMPUTER SOLD BY "B COMPANY" is reserved as icon 5804 in "QUERY RESERVE" 5803.

Figure 57:
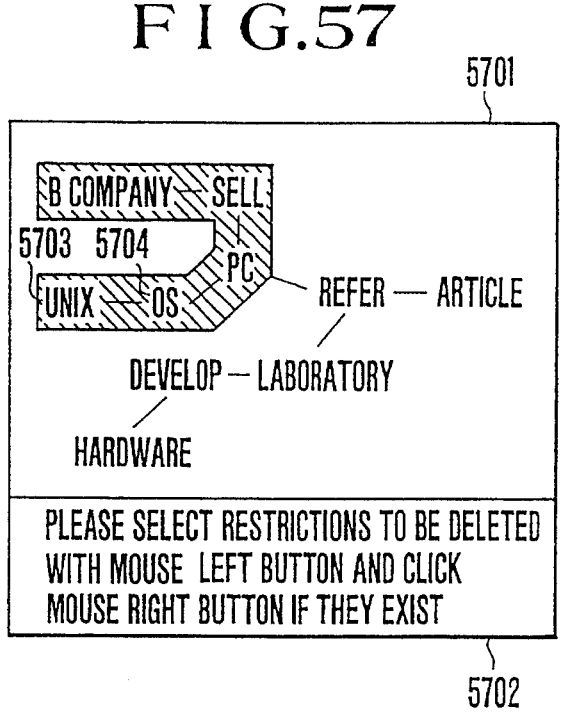
Figure 58:
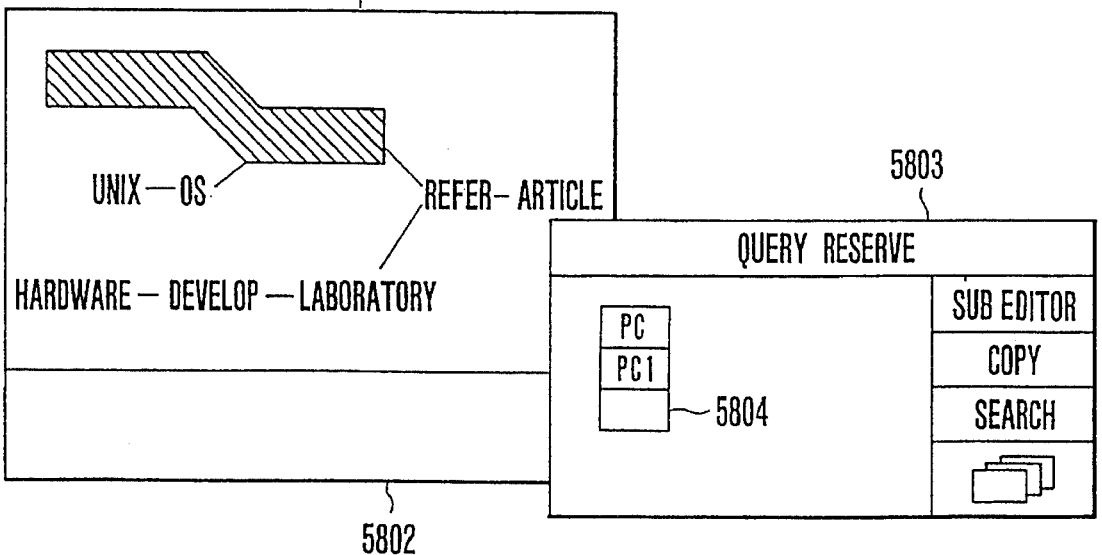
Figure 59:
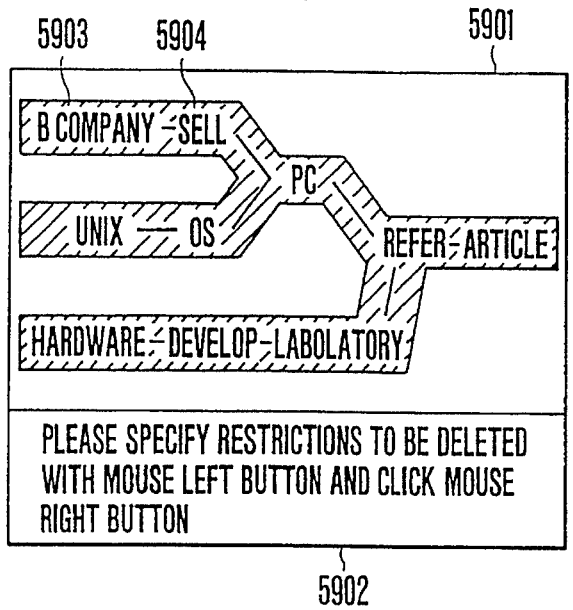
Figure 60:
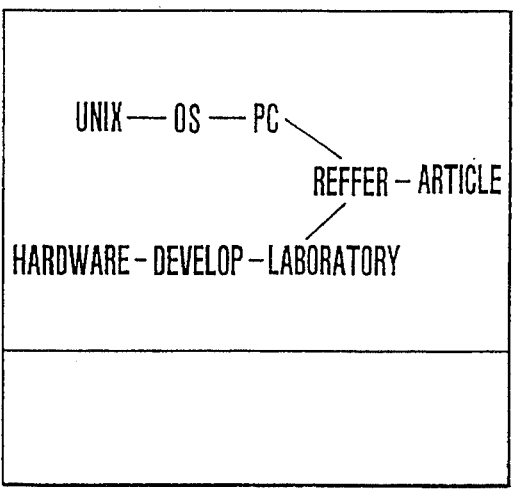
Figure 61:
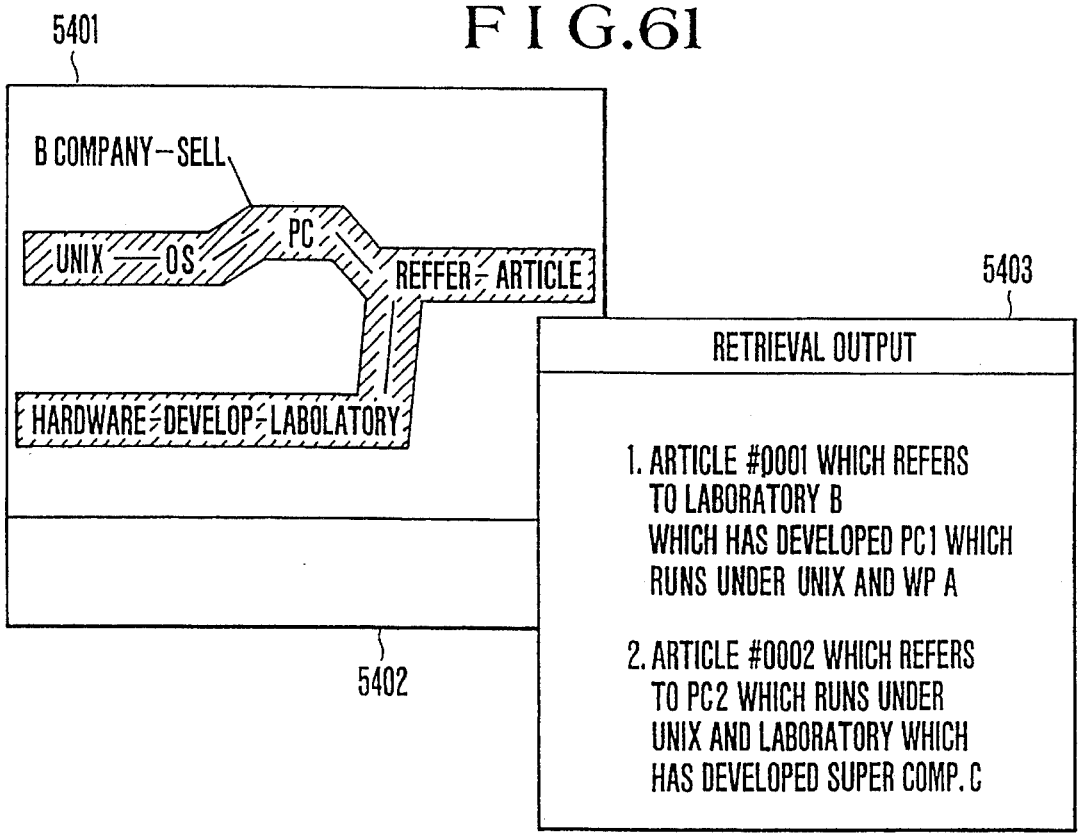
Figure 62:
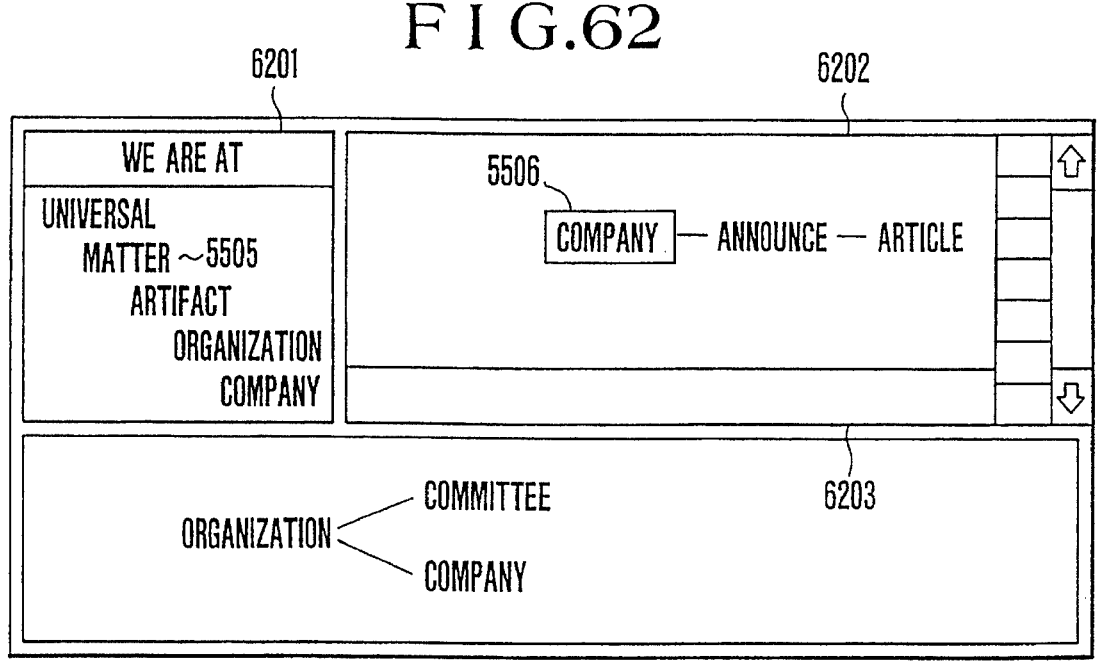
Figure 63:
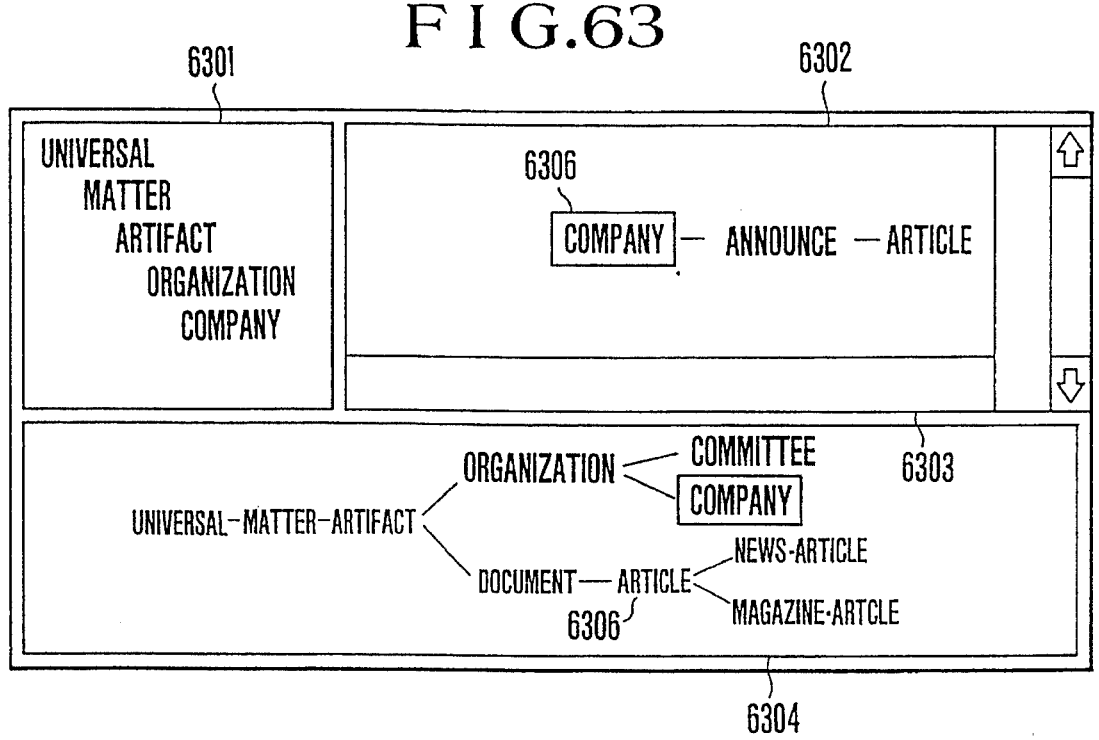

If item "ERASE" 1612 is selected with the mouse from the menu window in FIG. 51, "PLEASE SELECT CONCEPTS FROM WHICH RESTRICTIONS ARE TO BE DELETED." is displayed in the system message window, so that if "ARTICLE" 5104 is designated with the mouse, "ARTICLE" and all the restrictions related to the "ARTICLE" are shaded as shown in FIG. 57, and "PLEASE SELECT WITH LEFT MOUSE BUTTON RESTRICTIONS TO BE DELETED AND THEN CLICK RIGHT BUTTON." is displayed in the system message window. Accordingly, if, for example, "B COMPANY" 5903 or "SALE" 5904 is selected with the mouse, the shade of the portion "SOLD BY "B COMPANY"" is removed. Thereafter, if the right button is clicked, the query edition is changed as shown in FIG. 61.

If item "SEARCH" 1613 is selected with the mouse from the menu window in FIG. 51, "PLEASE SELECT WITH MOUSE A CONCEPT TO BE SEARCH." is displayed in the system message window, so that if, for example, "ARTICLE" 5104 is selected with the mouse, "ARTICLE" and all the restrictions to the whole "ARTICLE" are shaded and "PLEASE SELECT WITH MOUSE RESTRICTIONS NOT USED FOR SEARCH AND CLICK RIGHT BUTTON." is displayed in the system message window. Thus, if, for example, either "B COMPANY" 4203 or "SELL" 4204 is selected with the mouse as shown in FIG. 42, the shade of the portion "SOLD BY "B COMPANY"" is removed, so that if the right button is clicked, the "ARTICLE WHICH REFERS TO LABORATORY WHICH HAS DEVELOPED PERSONAL COMPUTER USING UNIX AS 0S AND HARDWARE" is searched and the results of the search are shown as in FIG. 61. Search of "DOCUMENT" 3603 of FIG. 36 is conducted using the following query editions for the article created on the basis of data on each of the concepts as mentioned above:

```
(DOCUMENT
    (SUBJECT (COMPUTER
        (DEVELOP (COMPANY))))
    (ANNOUNCE (COMPANY)))
```

Since, however, the two "COMPANIES" as the query editions are not handled as the same company, search should be conducted by attachment of conditions that the two "COMPANIES" in the query editions are the same. For search of "ARTICLE" 4003 of FIG. 40, two query editions:

```
(ARTICLE
    (REFER (PERSONAL COMPUTER
        (SELL "B COMPANY"
        (DEVELOP UNIVERSITY))))
and
(ARTICLE
    (REFER (WORD PROCESSOR
        (SELL "B COMPANY"))))
``` should be created, search for the respective query editions should be conducted and indications of the searched articles should not be overlapped.

All the ones of the current concepts "COMPANY" 6206 to be rewritten are displayed in the same front in the tree indication of the concept tree window. If "MATTER" 6205 is designated with the mouse in the superconcept window 6201, the current concept "COMPANY" 6405 is displayed by scaling down the front of concepts other than the concept to be rewritten, as in concept tree window 6304. If "COMPANY" 6305 is selected with the mouse in the superconcept window 6301, concepts "COMPANY" 6305 and others are displayed as in concept tree window 6404.

As described above according to the present invention, many-sided data on the current concept can be viewed simultaneously. Namely, the position of the current concept and the world containing the current concept in the whole system of knowledge can be seen visually in a network and understanding the structure of the network is facilitated. Since the history of the current concept is displayed in a network structure, and the current concept can again be moved to a displayed concept, the same concept need not be searched repeatedly to thereby improve operability. In addition, since the user can edit a network to be displayed in the picture, concepts of interest can be displayed collectively to thereby display a network efficiently on the limited picture.

What is claimed is:

1. A concept network display system for representing knowledge-based information in a combination of concept nodes and relation links, comprising:

input means for inputting data to indicate a current concept;

knowledge base storage means for holding said knowledge-based information;

display means for displaying concepts stored in said knowledge base storage means;

first means for controlling said display means to display a concept tree window for showing concepts in a hierarchical tree arrangement including a current concept indicated by said input means;

second means for controlling said display means to display a superconcept window for showing a superconcept of said current concept;

third means for controlling said display means to display a subnetwork window for showing at least one concept combined with said current concept in any of instance relation and generic relation;

select means responding to an input of data via said input means for selecting a concept of said concepts displayed on one of said windows by said display means to designate the selected concept as a new current concept; and rewrite means responsive to said new current concept for rewriting said concept tree window, said superconcept window and said subnetwork window based on said new current concept.

2. A concept network display system according to claim 1, said first means including means for changing the concepts displayed in the concept tree window to another hierarchical tree arrangement including said new current concept.

3. A concept network display system according to claim 1, further comprising:

holding means for holding a sequence of current concepts indicated sequentially without repeat of a concept in the sequence; and means for controlling said display means for displaying the sequence of current concepts as a history of the current concepts.

4. A concept network display system according to claim 1, including means for rewriting a subconcept for the concept displayed in the concept tree window with a depth and a branching factor.

5. A concept network display system according to claim 1, including means responsive to an input via said input means for erasing a concept from said concepts displayed in the concept tree window.

6. A concept network display system according to claim 1, further including threshold means for briefly describing concepts at a distance less than a predetermined threshold from said current concept displayed in the concept tree window.

7. A query edition display system for expressing knowledge in a combination of concepts and relations, comprising:

memory means for storing knowledge in a combination of concepts and relations;

command input means for inputting a command and creating in response to said command, a complicated expression of a query edition on the basis of concepts by referring to said stored knowledge;

a controller for arranging said complicated expression of a query edition in an easily understandable form;

display means for displaying said easily understandable form of said query edition; and means for allowing the same concept present in the created query edition to add restrictions to two or more concepts through relations.

8. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for effecting plural-sided retrieval on a single query edition when the user limits retrieval conditions to the created query edition or a concept in the query edition.

9. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for deleting unnecessary concepts and relations in the created query edition when designated with a mouse to thereby change the query edition.

10. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for displaying in the form of a menu changeable ones of relations among concepts present in the created query edition and for changing the changeable relations by selecting an appropriate item of the menu.

11. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition, and means for displaying a concept describable in parallel with a concept present in the created query edition, together with the clear designation of the parallel relationship therebetween.

12. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for automatically allocating a relation to thereby make a retrieval, in response to the designation of the relation among the concepts with a depth by the user if the relation among the concepts is unclear when the query edition is created.

13. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for eliminating a particular concept from other concepts as an object in the query edition.

14. A query edition display system for expressing knowledge in a combination of concepts and relations, comprising:

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition, and means for briefly indicating a query edition using the indication of a concept in the query edition in a nominal compound or in an icon.

15. A query edition display system for expressing knowledge in a combination of concepts and relations, comprising:.

memory means for storing knowledge in a combination of concepts and relations;

command input means for inputting a command and creating, in response to said command, a complicated expression of a query edition on the basis of concepts by referring to said stored knowledge;

a controller for arranging said complicated expression of a query edition in an easily understandable form;

display means for displaying said easily understandable form of said query edition; and means for displaying an icon and holding a concept in the query edition and the result of retrieval of the concept and for using the held concept and result for later retrieval and creation of a query edition.

16. A query edition display system for expressing knowledge in a combination of concepts and relations, comprising:

memory means for storing knowledge in a combination of concepts and relations;

command input means for inputting a command and creating in response to said command, a complicated expression of a query edition on the basis of concepts by referring to said stored knowledge;

a controller for arranging said complicated expression of a query edition in an easily understandable form;

display means for displaying said easily understandable form of said query edition; and means for designating a concept displayed in a superconcept display window and rewriting the display of a concept tree window with subconcepts thereof and others, and means for emphatically displaying only a range in which a current concept is rewritable.

17. A graphical query editing system for formulating query conditions represented in terms of concepts and their relations defined between said concepts comprising:

storage means for storing information to be retrieved and knowledge, said knowledge being represented in terms of concepts, each of which has a string of characters as a name, and relations each of which connects two of said concepts, at least some of said relations being subsumption relations which define taxonomical hierarchy of said concepts;

first display means for displaying a window of concepts on a screen of a system, centered around a current concept specified by the user of the system, said concepts being displayed in a form of a hierarchical tree;

second display means for displaying on said screen a window of superclass concepts of said current concept, said superclass concepts subsuming said current concept directly or indirectly;

third display means for displaying a window of a query condition being formulated in a graphical manner, said query condition being represented in terms of concepts and relations connecting any two of said concepts, wherein a pair of a relation and a concept constitutes a conditional phrase;

fourth display means for displaying a menu of query editing functions available in the system in a graphical manner, said editing functions including adding to a query condition being formulated a new conditional phase and deleting a conditional phase;

selection means for allowing said user to input character strings and data;

query editing means for creating a query condition, which changes the internal representation of a query condition in response to said user's selection of concepts and relation displayed by said third display means, and in response to said user's selection of query editing functions displayed by said fourth display means, said selection being carried out by said selection means;

information retrieval means for retrieving information from said storage means based on a query condition created and stored internally by said query editing means; and fifth display means for displaying the result of the retrieval done by said information retrieval means.

18. A graphical query editing system according to claim 17, further comprising query reservation means for reserving formulated query conditions for later reuse, associated with a name in terms of a string of characters.

19. A graphical query editing system according to claim 18, wherein said query editing means allows said user to search and to reuse any of said reserved query conditions by appending said reserved query condition to a query condition to be formulated.

20. A graphical query editing system according to claim 17, further comprising sixth display means for displaying the history of said user's concept in said window of concepts displayed by said first display means.

21. A graphical query editing system according to claim 17, wherein said editing functions further include changing a concept in said query condition, and changing a relation in said query condition.

22. A graphical query editing system according to claim 21, wherein said editing functions further include adding a concept that is to be conditioned by said query condition.

* * * * *